(12) United States Patent
Fujii et al.

(10) Patent No.: US 12,480,533 B2
(45) Date of Patent: Nov. 25, 2025

(54) WORK MACHINE CONTROL SYSTEM, WORK MACHINE, WORK MACHINE CONTROL METHOD, AND WORK MACHINE CONTROL DEVICE

(71) Applicant: Komatsu Ltd., Tokyo (JP)

(72) Inventors: Yusuke Fujii, Tokyo (JP); Yuuji Shibata, Tokyo (JP)

(73) Assignee: KOMATSU LTD., Tokyo (JP)

( * ) Notice: Subject to any disclaimer, the term of this patent is extended or adjusted under 35 U.S.C. 154(b) by 865 days.

(21) Appl. No.: 17/775,781

(22) PCT Filed: Dec. 9, 2020

(86) PCT No.: PCT/JP2020/045838
§ 371 (c)(1),
(2) Date: May 10, 2022

(87) PCT Pub. No.: WO2021/131700
PCT Pub. Date: Jul. 1, 2021

(65) Prior Publication Data
US 2022/0381005 A1    Dec. 1, 2022

(30) Foreign Application Priority Data
Dec. 27, 2019    (JP) .................................. 2019-239546

(51) Int. Cl.
*F15B 11/048*    (2006.01)
*E02F 9/22*    (2006.01)
(Continued)

(52) U.S. Cl.
CPC .......... *F15B 11/048* (2013.01); *E02F 9/2214* (2013.01); *E02F 9/265* (2013.01);
(Continued)

(58) Field of Classification Search
CPC . F15B 11/048; F15B 11/0423; F15B 2211/45; F15B 2211/6336; E02F 9/2214
See application file for complete search history.

(56) References Cited

U.S. PATENT DOCUMENTS 5,680,760 A * 10/1997 Lunzman .............. E02F 9/2228
                                                                  60/494
5,950,430 A    9/1999 Tohji et al.
(Continued)

FOREIGN PATENT DOCUMENTS

JP    S58-25126 Y2    5/1983
JP    H07-063203 A    3/1995
(Continued)

OTHER PUBLICATIONS

Office Action dated Aug. 7, 2023, issued in the corresponding AU patent application No. 2020415637.
(Continued)

*Primary Examiner* — Thomas E Lazo
(74) *Attorney, Agent, or Firm* — Troutman Pepper Locke LLP

(57) ABSTRACT

A work machine control system includes: a pump; a cylinder operating a working equipment element in a movable range based on hydraulic oil supplied from the pump; a first path connected to the pump; a second path branching from the first path; a control valve adjusting the flow rate of the oil supplied to the cylinder via the first path; a bleed valve adjusting the flow rate of the oil discharged to a tank via the second path; a sensor detecting a posture of the element in the range; and a control device outputting a first command for adjusting the flow rate of the oil supplied to the cylinder and a second command for adjusting the flow rate of the oil
(Continued)

discharged to the tank when the element is determined to be present in an end section of the range based on detection data of the sensor.

10 Claims, 11 Drawing Sheets

(51) Int. Cl.
*E02F 9/26* (2006.01)
*F15B 21/08* (2006.01)

(52) U.S. Cl.
CPC ......... *F15B 21/087* (2013.01); *F15B 2211/45* (2013.01); *F15B 2211/6313* (2013.01); *F15B 2211/6336* (2013.01); *F15B 2211/6346* (2013.01)

(56) References Cited

U.S. PATENT DOCUMENTS

| | | | |
|---|---|---|---|
| 9,834,908 B2 | 12/2017 | Iwasaki et al. | |
| 2004/0128868 A1* | 7/2004 | Helbling | F15B 11/048 37/348 |
| 2007/0033934 A1 | 2/2007 | Yamazaki et al. | |
| 2009/0288408 A1* | 11/2009 | Tozawa | F15B 11/17 60/435 |
| 2015/0361641 A1 | 12/2015 | Urbanowicz | |
| 2016/0376770 A1* | 12/2016 | Matsuzaki | E02F 9/2292 60/414 |
| 2017/0145662 A1 | 5/2017 | Iwasaki et al. | |
| 2018/0372131 A1* | 12/2018 | Werner | F15B 11/0423 |
| 2021/0071392 A1 | 3/2021 | Moriki et al. | |

FOREIGN PATENT DOCUMENTS

| | | |
|---|---|---|
| JP | H1018359 A | 1/1998 |
| JP | 2002-21804 A | 1/2002 |
| JP | 2006177560 A | 7/2006 |
| JP | 2016-169796 A | 9/2016 |
| JP | 6001808 B2 | 10/2016 |
| WO | 2016/056678 A1 | 4/2016 |
| WO | 2019/139104 A1 | 7/2019 |

OTHER PUBLICATIONS

Office Action mailed Feb. 12, 2025, issued in the corresponding Japanese patent application No. 2023-211125 and English translation thereof.

* cited by examiner

WORK MACHINE CONTROL SYSTEM, WORK MACHINE, WORK MACHINE CONTROL METHOD, AND WORK MACHINE CONTROL DEVICE

FIELD

The present disclosure relates to a work machine control system, a work machine, a work machine control method, and a work machine control device.

BACKGROUND

Cushion control as disclosed in Patent Literature 1 is known in the technical field related to work machines. The cushion control refers to control for decelerating a piston of a hydraulic cylinder when the piston approaches a stroke end. The cushion control reduces impact when the piston of the hydraulic cylinder reaches the stroke end. In Patent Literature 1, the control valve moves to a neutral position, an intermediate position, and an operation position. When the control valve is disposed at the neutral position, the supply flow path connecting the hydraulic pump and the hydraulic cylinder is closed, and the bleed passage connecting the hydraulic pump and the tank is opened. When the control valve is disposed at the intermediate position, the hydraulic oil from the hydraulic pump is distributed to the boom cylinder and the tank. When the control valve is disposed in the operation position, the supply flow path is opened and the bleed passage is closed.

CITATION LIST

Patent Literature

Patent Literature 1: JP 2016-169796 A

SUMMARY

Technical Problem

Flow force may act on the control valve. The flow force refers to the fluid force of the hydraulic oil acting on the spool of the control valve. When the flow force acts on the control valve, it may be difficult to control the velocity of the working equipment with high accuracy. In the cushion control, if the flow force acts on the control valve when the piston approaches the stroke end, an appropriate cushion effect may not be obtained. If an appropriate cushion effect cannot be obtained, operability of the working equipment deteriorates.

An object of the present disclosure is to obtain an appropriate cushion effect in cushion control.

Solution to Problem

According to an aspect of the present invention, a work machine control system, comprises: a hydraulic pump; a hydraulic cylinder that operates a working equipment element in a movable range based on hydraulic oil supplied from the hydraulic pump; a first flow path connected to the hydraulic pump; a second flow path branching from the first flow path; a flow rate control valve that adjusts a flow rate of the hydraulic oil supplied to the hydraulic cylinder via the first flow path; a bleed valve that adjusts a flow rate of the hydraulic oil discharged to a tank via the second flow path; a posture sensor that detects a posture of the working equipment element in the movable range; and a control device that outputs a first control command for adjusting the flow rate of the hydraulic oil supplied to the hydraulic cylinder and a second control command for adjusting the flow rate of the hydraulic oil discharged to the tank when it is determined that the working equipment element is present in an end section including an end position of the movable range based on detection data of the posture sensor.

Advantageous Effects of Invention

According to the present disclosure, an appropriate cushion effect can be obtained in cushion control.

DESCRIPTION OF EMBODIMENTS

Hereinafter, embodiments according to the present disclosure will be described with reference to the drawings, but the present disclosure is not limited thereto. The components of the embodiments described below can be appropriately combined. In addition, some components may not be used.

[Work Machine]

Figure 1:
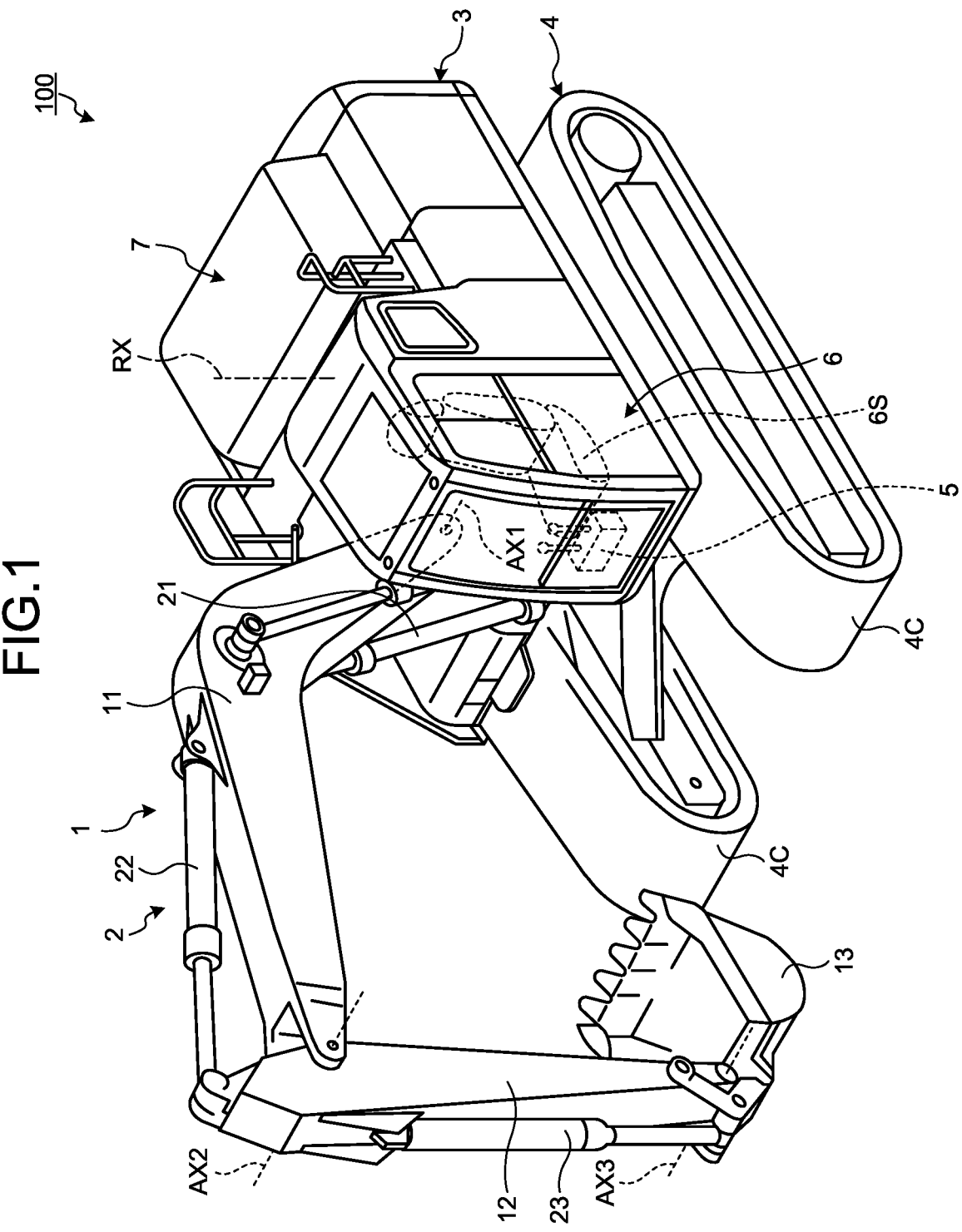
FIG. 1 is a perspective view illustrating a work machine according to an embodiment.

FIG. 1 is a perspective view illustrating a work machine 100 according to an embodiment. In the embodiment, an example in which the work machine 100 is an excavator will be described. In the following description, the work machine 100 is appropriately referred to as an excavator 100.

As illustrated in FIG. 1, the excavator 100 includes a working equipment 1, a hydraulic cylinder 2, a swing body 3, a traveling body 4, and an operation device 5.

The swing body 3 supports the working equipment 1. The swing body 3 swings about the swing axis RX. The swing body 3 swings by power generated by a swing motor (not illustrated). The swing body 3 includes a driver's cab 6 and a machine chamber 7. A driver of the excavator 100 boards the driver's cab 6. A driver's seat 6S on which the driver sits is provided in the driver's cab 6.

The traveling body 4 supports the swing body 3. The traveling body 4 includes a pair of crawler belts 4C. The crawler belts 4C are rotated by power generated by a traveling motor (not illustrated). The excavator 100 travels by the rotation of the crawler belts 4C. Note that the traveling body 4 may include tires attached to the axle.

The working equipment 1 is supported by the swing body 3. The working equipment 1 includes a plurality of relatively movable working equipment elements. The working equipment elements of the working equipment 1 include a boom 11 connected to the swing body 3, an arm 12 connected to the boom 11, and a bucket 13 connected to the arm 12.

The boom 11 and the swing body 3 are connected via a boom pin. The boom 11 is supported by the swing body 3 so as to be rotatable about the rotation axis AX1.

The boom 11 and the arm 12 are connected via an arm pin. The arm 12 is supported by the boom 11 so as to be rotatable about the rotation axis AX2.

The arm 12 and the bucket 13 are connected via a bucket pin. The bucket 13 is supported by the arm 12 so as to be rotatable about the rotation axis AX3.

The rotation axis AX1, the rotation axis AX2, and the rotation axis AX3 are parallel to each other. The rotation axis AX1 and an axis parallel to the swing axis RX are orthogonal to each other. In the following description, a direction parallel to the swing axis RX is appropriately referred to as a vertical direction of the swing body 3, a direction parallel to the rotation axis AX1 is appropriately referred to as a vehicle width direction or a left-right direction of the swing body 3, and a direction orthogonal to both the rotation axis AX1 and the swing axis RX is appropriately referred to as a front-rear direction of the swing body 3. A direction in which the working equipment 1 is present with reference to the swing axis RX is a forward direction. A direction in which the machine chamber 7 is present with reference to the swing axis RX is a backward direction.

The hydraulic cylinder 2 operates the working equipment element based on the hydraulic oil. A plurality of hydraulic cylinders 2 are provided to operate each of the plurality of working equipment elements. The hydraulic cylinder 2 includes a boom cylinder 21 that operates the boom 11, an arm cylinder 22 that operates the arm 12, and a bucket cylinder 23 that operates the bucket 13.

The operation device 5 is operated by a driver of the excavator 100. The operation device 5 is operated to operate the working equipment 1 and the swing body 3. The operation device 5 is disposed in the driver's cab 6. The operation device 5 includes a plurality of operating levers. The working equipment 1 and the swing body 3 are operated by operating the operation device 5.

Figure 2:
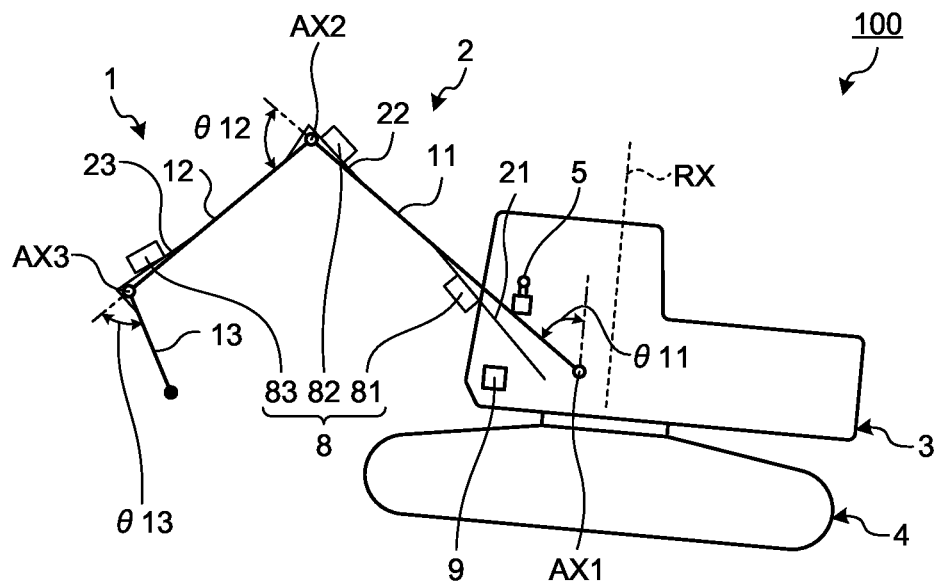
FIG. 2 is a side view schematically illustrating the work machine according to the embodiment.

FIG. 2 is a side view schematically illustrating the excavator 100 according to the embodiment. As illustrated in FIG. 2, the excavator 100 includes a posture sensor 8 that detects the posture of the working equipment element and a control device 9.

The posture of the working equipment element includes an angle of the working equipment element. The posture sensor 8 detects an angle of the working equipment element. The posture sensor 8 includes a boom posture sensor 81 that detects an angle $\theta 11$ of the boom 11 about the rotation axis AX1, an arm posture sensor 82 that detects an angle $\theta 12$ of the arm 12 about the rotation axis AX2, and a bucket posture sensor 83 that detects an angle $\theta 13$ of the bucket 13 about the rotation axis AX3. In the embodiment, the angle $\theta 11$ of the boom 11 is an angle formed by the swing axis RX of the swing body 3 and the boom 11. The angle $\theta 12$ of the arm 12 is an angle formed by the boom 11 and the arm 12. The angle $\theta 13$ of the bucket 13 is an angle formed by the arm 12 and the bucket 13.

In the embodiment, the posture sensor 8 is a stroke sensor disposed in the hydraulic cylinder 2. The hydraulic cylinder 2 includes a cylinder tube, a piston that moves inside the cylinder tube, and a rod connected to the piston. The stroke sensor detects a stroke length of the hydraulic cylinder 2 indicating a movement distance of the rod. The stroke length is a movement distance of the hydraulic cylinder 2 from the stroke end. The stroke end refers to an end position of the movable range of the rod. That is, the stroke end is the position of the rod at which the hydraulic cylinder 2 contracts the most or the position of the rod at which the hydraulic cylinder 2 extends the most.

The control device 9 includes a computer system. Detection data of the posture sensor 8 is output to the control device 9. The control device 9 calculates the angle of the working equipment element based on the detection data of the posture sensor 8. The angle of the working equipment element and the stroke length of the hydraulic cylinder 2 are correlated. The control device 9 can calculate the angle of the working equipment element by performing arithmetic processing based on the detection data of the posture sensor 8.

The boom posture sensor 81 is a stroke sensor disposed in the boom cylinder 21. The stroke sensor disposed in the boom cylinder 21 detects a stroke length of the boom cylinder 21. The control device 9 can calculate the angle $\theta 11$ of the boom 11 with respect to the swing body 3 by performing arithmetic processing based on the detection data of the boom posture sensor 81.

The arm posture sensor 82 is a stroke sensor disposed in the arm cylinder 22. The stroke sensor disposed in the arm cylinder 22 detects a stroke length of the arm cylinder 22. The control device 9 can calculate the angle $\theta 12$ of the arm 12 with respect to the boom 11 by performing arithmetic processing based on the detection data of the arm posture sensor 82.

The bucket posture sensor 83 is a stroke sensor disposed in the bucket cylinder 23. The stroke sensor disposed in the bucket cylinder 23 detects a stroke length of the bucket cylinder 23. The control device 9 can calculate the angle $\theta 13$ of the bucket 13 with respect to the arm 12 by performing arithmetic processing based on the detection data of the bucket posture sensor 83.

In addition, the control device 9 can calculate the cylinder position indicating the position of the end portion of the rod on the side opposite to the piston of the hydraulic cylinder 2 based on the detection data of the posture sensor 8. The cylinder position is a relative position of the rod with respect to the stroke end. The control device 9 can calculate the cylinder position of the boom cylinder 21 by performing arithmetic processing based on the detection data of the boom posture sensor 81. The control device 9 can calculate the cylinder position of the arm cylinder 22 by performing arithmetic processing based on the detection data of the arm posture sensor 82. The control device 9 can calculate the cylinder position of the bucket cylinder 23 by performing arithmetic processing based on the detection data of the bucket posture sensor 83.

In addition, the control device 9 can calculate the cylinder velocity indicating the velocity of the rod with respect to the cylinder tube of the hydraulic cylinder 2 based on the detection data of the posture sensor 8. The control device 9 can calculate the cylinder velocity of the boom cylinder 21 by performing arithmetic processing based on the detection data of the boom posture sensor 81. The control device 9 can calculate the cylinder velocity of the arm cylinder 22 by performing arithmetic processing based on the detection data of the arm posture sensor 82. The control device 9 can calculate the cylinder velocity of the bucket cylinder 23 by performing arithmetic processing based on the detection data of the bucket posture sensor 83.

That is, in the embodiment, the posture sensor 8 can function as an angle sensor of the working equipment element, a stroke length sensor of the hydraulic cylinder 2, a cylinder position sensor of the hydraulic cylinder 2, and a cylinder velocity sensor of the hydraulic cylinder 2.

Note that the posture sensor 8 may include an angle sensor capable of detecting an angle of the working equipment element such as a potentiometer.

[Operations of Working Equipment]

Figure 3:
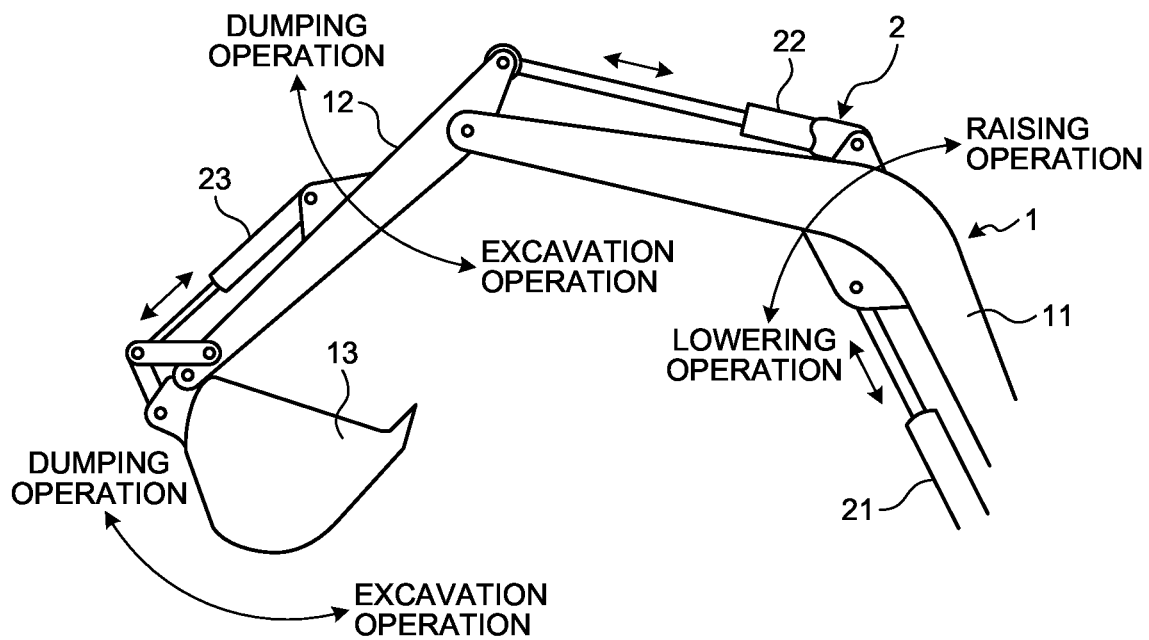
FIG. 3 is a schematic diagram for explaining operations of working equipment according to the embodiment.

FIG. 3 is a schematic diagram for explaining operations of the working equipment 1 according to the embodiment. The operation device 5 is operated to operate the working equipment 1 and the swing body 3. When the operation device 5 is operated, the hydraulic cylinder 2 or the swing motor (not illustrated) is driven. The working equipment 1 is operated by driving the hydraulic cylinder 2. The swing body 3 is operated by driving the swing motor. When the operation device 5 is operated, the raising operation of the boom 11, the lowering operation of the boom 11, the excavation operation of the arm 12, the dumping operation of the arm 12, the dumping operation of the bucket 13, and the excavation operation of the bucket 13 are performed. When the operation device 5 is operated, the swinging operation of the swing body 3 is performed.

When the boom cylinder 21 extends, the boom 11 performs the raising operation. When the boom cylinder 21 contracts, the boom 11 performs the lowering operation.

When the arm cylinder 22 extends, the arm 12 performs the excavation operation. When the arm cylinder 22 contracts, the arm 12 performs the dumping operation.

When the bucket cylinder 23 extends, the bucket 13 performs the excavation operation. When the bucket cylinder 23 contracts, the bucket 13 performs the dumping operation.

When the swing motor is driven, the swing body 3 performs the swinging operation.

[Movable Range of Working Equipment Element]

Figure 4:
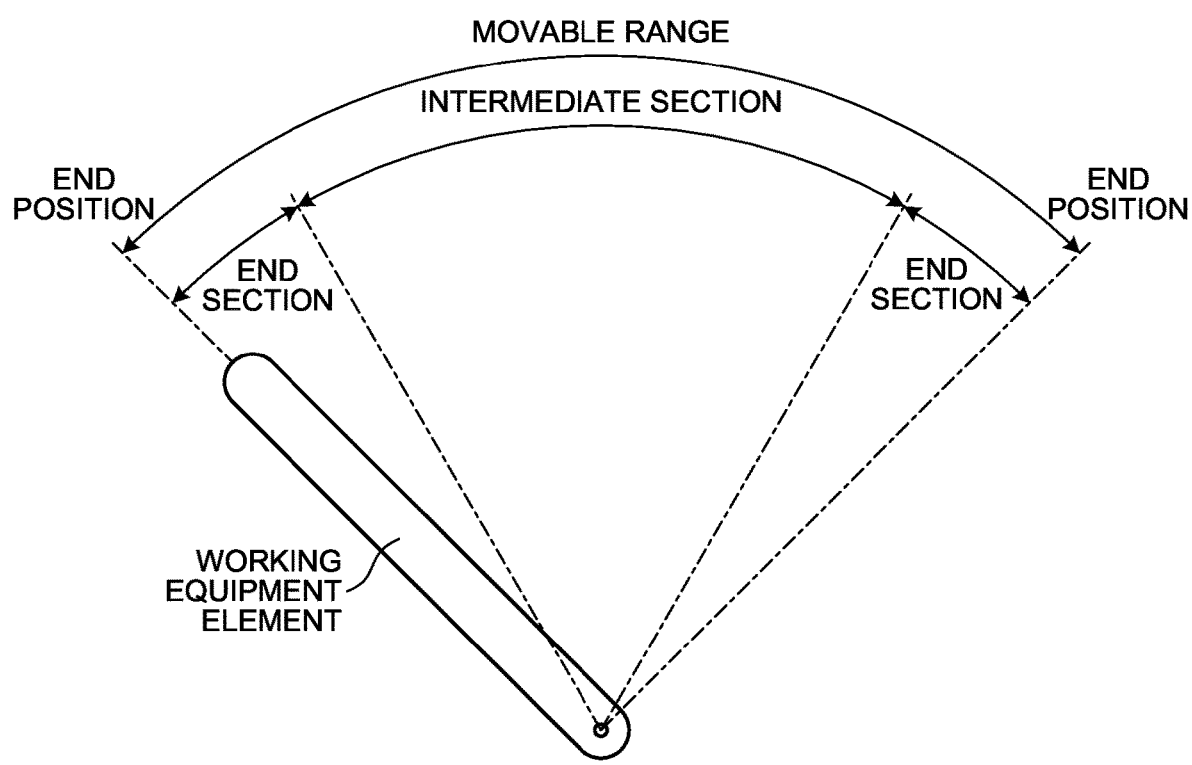
FIG. 4 is a schematic diagram for explaining a movable range of a working equipment element according to the embodiment.

FIG. 4 is a schematic diagram for explaining the movable range of the working equipment element according to the embodiment. The working equipment element can move in the movable range defined by the stroke of the hydraulic cylinder 2. The movable range of the working equipment element is uniquely determined based on the movable range of the rod of the hydraulic cylinder 2. The end position of the movable range of the working equipment element is defined based on the stroke end of the hydraulic cylinder 2. When the hydraulic cylinder 2 reaches the stroke end, the working equipment element reaches the end position of the movable range. In the embodiment, in the movable range of the working equipment element, a predetermined section including the end position is appropriately referred to as an end section, and a section different from the end section is appropriately referred to as an intermediate section.

The ratio of the length of the end section to the movable range can be arbitrarily set. The end section may have an arbitrary ratio of 1[%] or more and 20[%] or less of the movable range. In addition, the ratio of the length of the end section may be a fixed value regardless of the operation amount of the operation device 5, or may be a variable value that changes according to the operation amount.

[Control System]

Figure 5:
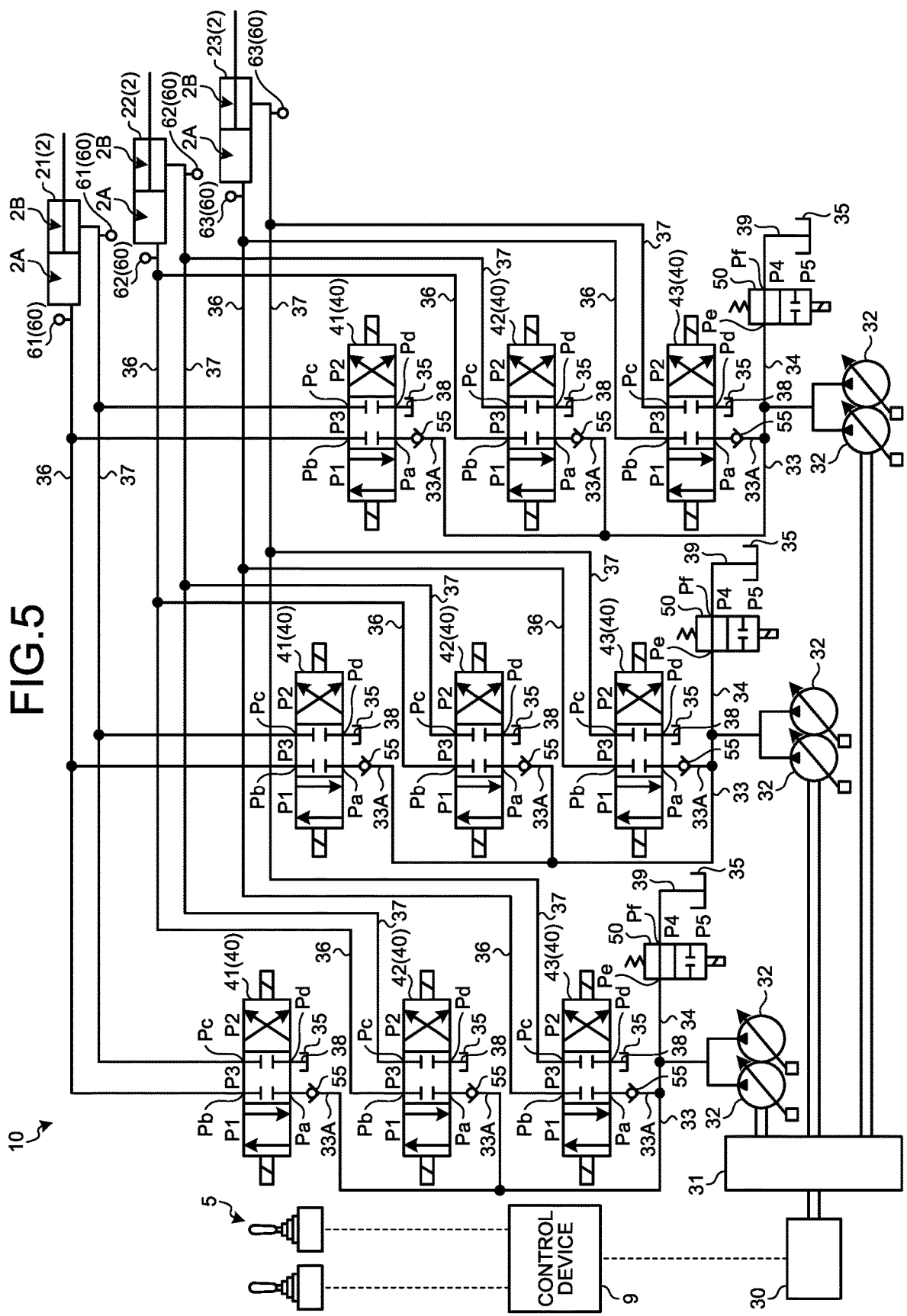
FIG. 5 is a schematic diagram illustrating a control system of the work machine according to the embodiment.

FIG. 5 is a schematic diagram illustrating a control system 10 of the excavator 100 according to the embodiment. As illustrated in FIG. 5, the control system 10 includes an engine 30, a power transmission mechanism 31, a hydraulic pump 32, a first flow path 33, a second flow path 34, a tank 35, the hydraulic cylinder 2, a flow rate control valve 40, a bleed valve 50, and the control device 9. Each of the engine 30, the power transmission mechanism 31, the hydraulic pump 32, and the tank 35 is disposed in the machine chamber 7 of the swing body 3.

The engine 30 is a power source of the excavator 100. An example of the engine 30 is a diesel engine.

The power transmission mechanism 31 transmits power generated by the engine 30 to the hydraulic pump 32. In the embodiment, a plurality of hydraulic pumps 32 are provided. In the example illustrated in FIG. 5, six hydraulic pumps 32 are provided. The power transmission mechanism 31 distributes power generated by the engine 30 to the plurality of hydraulic pumps 32.

The hydraulic pump 32 is driven by power transmitted from the power transmission mechanism 31. The hydraulic pump 32 discharges hydraulic oil. In the embodiment, the hydraulic pump 32 is a variable displacement hydraulic pump.

The hydraulic cylinder 2 operates the working equipment element in the movable range based on the hydraulic oil supplied from the hydraulic pump 32. As described above, the hydraulic cylinder 2 includes the boom cylinder 21 that operates the boom 11, the arm cylinder 22 that operates the arm 12, and the bucket cylinder 23 that operates the bucket 13.

The hydraulic cylinder 2 includes a bottom chamber 2A and a rod chamber 2B. When the hydraulic oil is supplied to the bottom chamber 2A, the hydraulic cylinder 2 extends. When the hydraulic oil is supplied to the rod chamber 2B, the hydraulic cylinder 2 contracts.

The first flow path 33 is connected to a discharge port of the hydraulic pump 32. In the example illustrated in FIG. 5, the first flow path 33 is connected to each of discharge ports of two hydraulic pumps 32. The hydraulic oil discharged from the discharge port of the hydraulic pump 32 can flow through the first flow path 33. The hydraulic oil discharged from the hydraulic pump 32 and flowing through the first flow path 33 is supplied to the hydraulic cylinder 2.

The second flow path 34 is provided so as to be branched from the first flow path 33. The hydraulic oil discharged from the discharge port of the hydraulic pump 32 can flow through the second flow path 34. The hydraulic oil discharged from the hydraulic pump 32 and flowing through the second flow path 34 is discharged to the tank 35.

The flow rate control valve 40 adjusts the flow rate of the hydraulic oil supplied to the hydraulic cylinder 2 via the first flow path 33. The bottom chamber 2A of the hydraulic cylinder 2 is connected to the flow rate control valve 40 via a bottom flow path 36. The rod chamber 2B of the hydraulic cylinder 2 is connected to the flow rate control valve 40 via a rod flow path 37.

The flow rate control valve 40 includes a boom flow rate control valve 41 that adjusts the flow rate of the hydraulic oil supplied to the boom cylinder 21, an arm flow rate control valve 42 that adjusts the flow rate of the hydraulic oil supplied to the arm cylinder 22, and a bucket flow rate control valve 43 that adjusts the flow rate of the hydraulic oil supplied to the bucket cylinder 23. The hydraulic oil discharged from the hydraulic pump 32 to the first flow path 33 is supplied to each of the boom flow rate control valve 41, the arm flow rate control valve 42, and the bucket flow rate control valve 43.

In the embodiment, a plurality of boom flow rate control valves 41, a plurality of arm flow rate control valves 42, and a plurality of bucket flow rate control valves 43 are provided. In the example illustrated in FIG. 5, three boom flow rate control valves 41 are provided. Three arm flow rate control valves 42 are provided. Three bucket flow rate control valves 43 are provided.

The bottom chamber 2A of the boom cylinder 21 is connected to each of the three boom flow rate control valves 41 via the bottom flow path 36. The rod chamber 2B of the boom cylinder 21 is connected to each of the three boom flow rate control valves 41 via the rod flow path 37.

The bottom chamber 2A of the arm cylinder 22 is connected to each of the three arm flow rate control valves 42 via the bottom flow path 36. The rod chamber 2B of the arm cylinder 22 is connected to each of the three arm flow rate control valves 42 via the rod flow path 37.

The bottom chamber 2A of the bucket cylinder 23 is connected to each of the three bucket flow rate control valves 43 via the bottom flow path 36. The rod chamber 2B of the bucket cylinder 23 is connected to each of the three bucket flow rate control valves 43 via the rod flow path 37.

The hydraulic pump 32 can supply hydraulic oil to each of the boom flow rate control valve 41, the arm flow rate control valve 42, and the bucket flow rate control valve 43 via the first flow path 33. A supply flow path 33A is connected to each of the boom flow rate control valve 41, the arm flow rate control valve 42, and the bucket flow rate control valve 43. The first flow path 33 is connected to each of the three supply flow paths 33A. The hydraulic oil discharged from the hydraulic pump 32 to the first flow path 33 is supplied to each of the boom flow rate control valve 41, the arm flow rate control valve 42, and the bucket flow rate control valve 43 via the supply flow paths 33A.

The bleed valve 50 adjusts the flow rate of the hydraulic oil discharged to the tank 35 via the second flow path 34. The bleed valve 50 is disposed in the second flow path 34. The hydraulic pump 32 can supply hydraulic oil to the bleed valve 50 via the second flow path 34. The second flow path 34 branches from the first flow path 33 between the hydraulic pump 32 and the flow rate control valve 40. The hydraulic oil discharged from the hydraulic pump 32 to the second flow path 34 is supplied to the bleed valve 50 without being supplied to the flow rate control valve 40.

Figure 6:
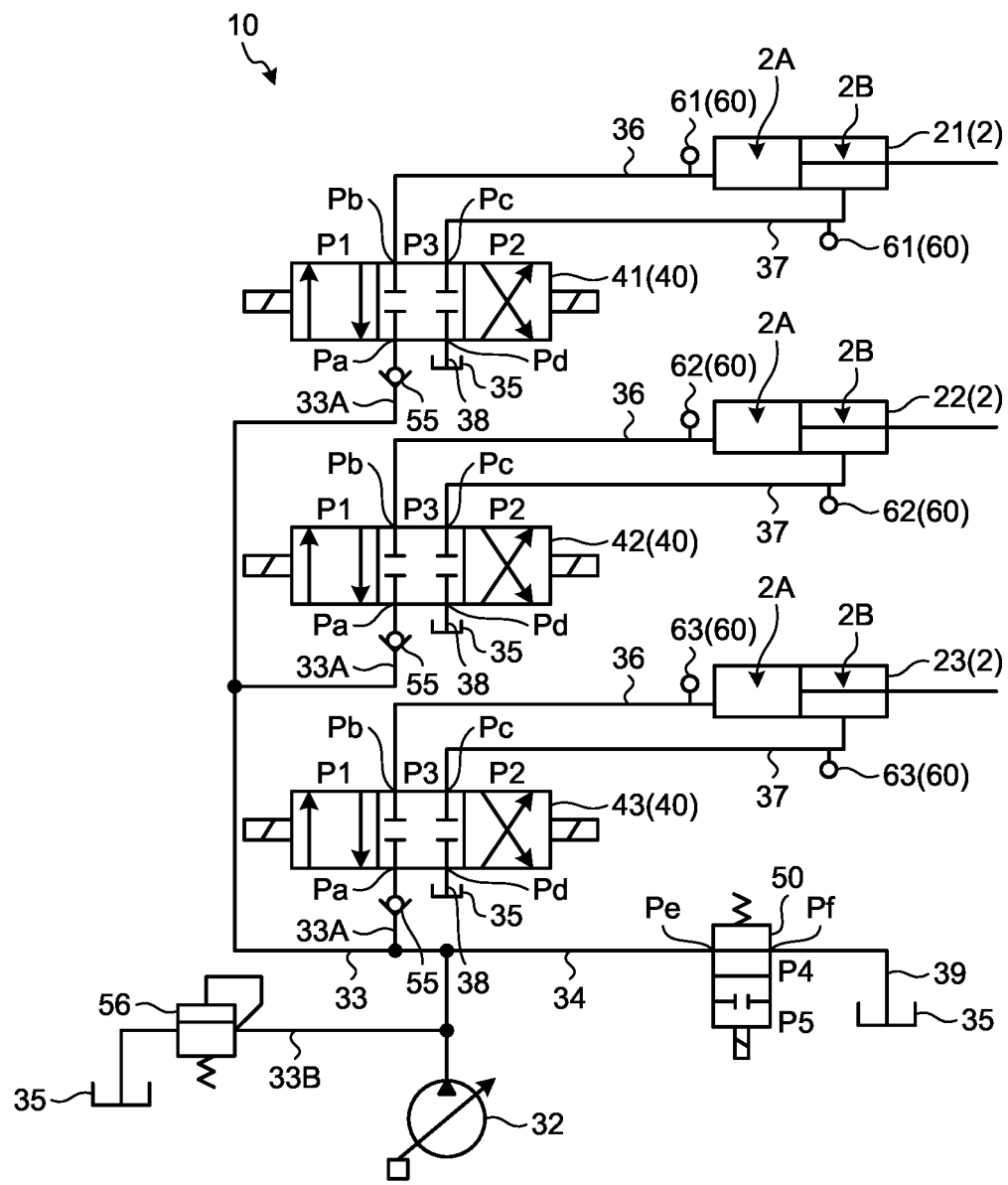
FIG. 6 is a schematic diagram illustrating a control system of the work machine according to the embodiment.

FIG. 6 is a schematic diagram illustrating the control system 10 of the excavator 100 according to the embodiment. FIG. 6 corresponds to a diagram obtained by extracting a part of FIG. 5. In the example illustrated in FIG. 5, the hydraulic oil from the two hydraulic pumps 32 disposed in tandem is merged and supplied to the plurality of flow rate control valves 40 (41, 42, 43) disposed in parallel, but in the example illustrated in FIG. 6, the number of hydraulic pumps 32 is one. The number of the hydraulic pumps 32 is arbitrary. In the example illustrated in FIG. 5, a plurality of hydraulic pumps 32 are connected to the power transmission mechanism 31. The hydraulic oil discharged from the hydraulic pumps 32 disposed in tandem flows through one flow rate control valve 40 and then is merged and supplied to one hydraulic cylinder 2. A plurality of hydraulic circuits through which the hydraulic oil supplied to one hydraulic cylinder 2 flows are provided. In the example illustrated in FIG. 5, the hydraulic oil from the three flow rate control valves 40 (for example, 41, 41, 41) provided in the respective hydraulic circuits is merged and supplied to one hydraulic cylinder 2 (for example, the boom cylinder 21), but in the example illustrated in FIG. 6, the hydraulic oil is supplied from one flow rate control valve 40 to one hydraulic cylinder 2. The number of flow rate control valves 40 that supply hydraulic oil to one hydraulic cylinder 2 is arbitrary.

As illustrated in FIG. 6, the control system 10 includes a hydraulic pump 32, a hydraulic cylinder 2 that operates a working equipment element in a movable range based on hydraulic oil supplied from the hydraulic pump 32, a first flow path 33 connected to the hydraulic pump 32, a second flow path 34 branching from the first flow path 33, a flow rate control valve 40 that adjusts the flow rate of the hydraulic oil supplied to the hydraulic cylinder 2 via the first flow path 33, and a bleed valve 50 that adjusts the flow rate of the hydraulic oil discharged to the tank 35 via the second flow path 34. The second flow path 34 branches from the first flow path 33 between the hydraulic pump 32 and the flow rate control valve 40.

As illustrated in FIG. 6, the flow rate control valve 40 includes a pump port Pa, a bottom port Pb, a rod port Pc, and a tank port Pd.

The pump port Pa is connected to the hydraulic pump 32 via the supply flow path 33A and the first flow path 33. The hydraulic oil discharged from the hydraulic pump 32 can flow through the first flow path 33 and the supply flow path 33A and then flow into the flow rate control valve 40 from the pump port Pa.

The bottom port Pb is connected to the bottom chamber 2A of the hydraulic cylinder 2 via the bottom flow path 36. The hydraulic oil flowing out from the bottom port Pb can flow through the bottom flow path 36 and then flow into the bottom chamber 2A of the hydraulic cylinder 2. In addition, the hydraulic oil flowing out of the bottom chamber 2A of the hydraulic cylinder 2 can flow through the bottom flow path 36 and then flow into the flow rate control valve 40 from the bottom port Pb.

The rod port Pc is connected to the rod chamber 2B of the hydraulic cylinder 2 via the rod flow path 37. The hydraulic oil flowing out from the rod port Pc can flow through the rod flow path 37 and then flow into the rod chamber 2B of the hydraulic cylinder 2. In addition, the hydraulic oil flowing out of the rod chamber 2B of the hydraulic cylinder 2 can flow through the rod flow path 37 and then flow into the flow rate control valve 40 from the rod port Pc.

The tank port Pd is connected to the tank 35 via a discharge flow path 38. The hydraulic oil flowing out of the tank port Pd flows through the discharge flow path 38 and then is discharged to the tank 35.

The flow rate control valve 40 is a slide spool type flow rate control valve that switches the flow rate and direction of the hydraulic oil supplied to the hydraulic cylinder 2 by moving a rod-shaped spool. When the spool moves in the axial direction, the supply of the hydraulic oil to the bottom chamber 2A and the supply of the hydraulic oil to the rod chamber 2B are switched. In addition, the flow rate of the hydraulic oil supplied to the hydraulic cylinder 2 is adjusted based on the movement amount of the spool.

In the embodiment, the spool of the flow rate control valve 40 moves to a first operation position P1 at which the hydraulic oil is supplied to the bottom chamber 2A of the hydraulic cylinder 2, a second operation position P2 at which the hydraulic oil is supplied to the rod chamber 2B of the hydraulic cylinder 2, and a stop position P3 disposed between the first operation position P1 and the second operation position P2 and at which the hydraulic oil does not flow.

When the spool of the flow rate control valve 40 is disposed at the first operation position P1, the hydraulic oil discharged from the hydraulic pump 32 flows through the first flow path 33 and the supply flow path 33A, then flows into the flow rate control valve 40 from the pump port Pa, and flows out from the bottom port Pb. The hydraulic oil flowing out from the bottom port Pb flows through the bottom flow path 36 and then flows into the bottom chamber 2A of the hydraulic cylinder 2. As a result, the hydraulic cylinder 2 extends. When the hydraulic cylinder 2 extends, the hydraulic oil flows out from the rod chamber 2B. The hydraulic oil flowing out from the rod chamber 2B of the hydraulic cylinder 2 flows through the rod flow path 37, then flows into the flow rate control valve 40 from the rod port Pc, and flows out from the tank port Pd. The hydraulic oil flowing out of the tank port Pd is discharged to the tank 35 via the discharge flow path 38.

When the spool of the flow rate control valve 40 is disposed at the second operation position P2, the hydraulic oil discharged from the hydraulic pump 32 flows through the first flow path 33 and the supply flow path 33A, then flows into the flow rate control valve 40 from the pump port Pa, and flows out from the rod port Pc. The hydraulic oil flowing out of the rod port Pc flows through the rod flow path 37 and then flows into the rod chamber 2B of the hydraulic cylinder 2. As a result, the hydraulic cylinder 2 contracts. When the hydraulic cylinder 2 contracts, the hydraulic oil flows out from the bottom chamber 2A. The hydraulic oil flowing out from the bottom chamber 2A of the hydraulic cylinder 2 flows through the bottom flow path 36, then flows into the flow rate control valve 40 from the bottom port Pb, and flows out from the tank port Pd. The hydraulic oil flowing out of the tank port Pd is discharged to the tank 35 via the discharge flow path 38.

When the spool of the flow rate control valve 40 is disposed at the stop position P3, the hydraulic oil cannot flow through the flow rate control valve 40.

The flow rate control valve 40 controls the flow rate of the hydraulic oil supplied to the hydraulic cylinder 2 by the movement amount of the spool. The aperture ratio of the port through which the hydraulic oil flows in the flow rate control valve 40 is adjusted by the movement amount of the spool. By adjusting the aperture ratio of the flow rate control valve 40, the flow rate of the hydraulic oil supplied to the hydraulic cylinder 2 is adjusted. The aperture ratio of the flow rate control valve 40 refers to the ratio of the size of the port to the maximum value of the size of the port. When the aperture ratio is 100[%], the size of the port of the flow rate control valve 40 is maximized, and the hydraulic oil is supplied to the hydraulic cylinder 2 at the maximum flow rate. When the aperture ratio of the flow rate control valve 40 is 0[%], the port of the flow rate control valve 40 is closed, and the supply of the hydraulic oil to the hydraulic cylinder 2 is stopped. In the embodiment, the aperture ratio of one flow rate control valve 40 is adjusted. In a case where a plurality of flow rate control valves 40 are used, the flow rate of the hydraulic oil supplied from each flow rate control valve 40 may be calculated in order to ensure a desired flow rate of the hydraulic oil.

The bleed valve 50 adjusts the flow rate of the hydraulic oil discharged to the tank 35 via the second flow path 34.

The bleed valve 50 has an inflow port Pe and an outflow port Pf.

The inflow port Pe is connected to the hydraulic pump 32 via the second flow path 34. The hydraulic oil discharged from the hydraulic pump 32 can flow through the second flow path 34, and then flow into the bleed valve 50 from the inflow port Pe.

The outflow port Pf is connected to the tank 35 via a tank flow path 39. The hydraulic oil flowing out of the outflow port Pf flows through the tank flow path 39 and then is discharged to the tank 35.

The spool of the bleed valve 50 moves to a discharge position P4 where the hydraulic oil is discharged to the tank 35 and a stop position P5 where the hydraulic oil does not flow.

When the spool of the bleed valve 50 is disposed at the discharge position P4, the hydraulic oil discharged from the hydraulic pump 32 flows through the second flow path 34, then flows into the bleed valve 50 from the inflow port Pe, and flows out from the outflow port Pf. The hydraulic oil flowing out of the outflow port Pf flows through the tank flow path 39 and then is discharged to the tank 35.

When the spool of the bleed valve 50 is disposed at the stop position P5, the hydraulic oil cannot flow through the bleed valve 50.

The bleed valve 50 controls the flow rate of the hydraulic oil discharged to the tank 35 by the movement amount of the spool. The aperture ratio of the port through which the hydraulic oil flows in the bleed valve 50 is adjusted by the movement amount of the spool. By adjusting the aperture ratio of the bleed valve 50, the flow rate of the hydraulic oil discharged to the tank 35 is adjusted. When the aperture ratio is 100[%], the size of the port of the bleed valve 50 is maximized, and the hydraulic oil is discharged to the tank 35 at the maximum flow rate. When the aperture ratio is 0[%], the port of the bleed valve 50 is closed, and the discharge of the hydraulic oil to the tank 35 is stopped.

Note that the supply flow path 33A is provided with a check valve 55 that suppresses backflow of the hydraulic oil from the pump port Pa to the hydraulic pump 32. In addition, a discharge flow path 33B branching from the first flow path 33 is provided. The discharge flow path 33B branches from the first flow path 33 between the second flow path 34 and the hydraulic pump 32. The discharge flow path 33B is connected to the tank 35. The discharge flow path 33B is provided with a relief valve 56 for releasing the pressure when the pressure in the first flow path 33 is excessively increased.

In addition, the control system 10 includes a pressure sensor 60 that detects the pressure of the hydraulic oil discharged from the hydraulic cylinder 2. The pressure sensor 60 includes a boom pressure sensor 61 that detects the pressure of the hydraulic oil discharged from the boom cylinder 21, an arm pressure sensor 62 that detects the pressure of the hydraulic oil discharged from the arm cylinder 22, and a bucket pressure sensor 63 that detects the pressure of the hydraulic oil discharged from the bucket cylinder 23.

In the embodiment, the pressure sensor 60 is provided in each of the bottom flow path 36 and the rod flow path 37. When the hydraulic cylinder 2 extends and the hydraulic oil is discharged from the rod chamber 2B, the pressure sensor 60 provided in the rod flow path 37 detects the pressure of the hydraulic oil discharged from the hydraulic cylinder 2. When the hydraulic cylinder 2 contracts and the hydraulic oil is discharged from the bottom chamber 2A, the pressure sensor 60 provided in the bottom flow path 36 detects the pressure of the hydraulic oil discharged from the hydraulic cylinder 2. Note that the pressure sensor 60 may be provided in each of the bottom chamber 2A and the rod chamber 2B.

[Control Device]

Figure 7:
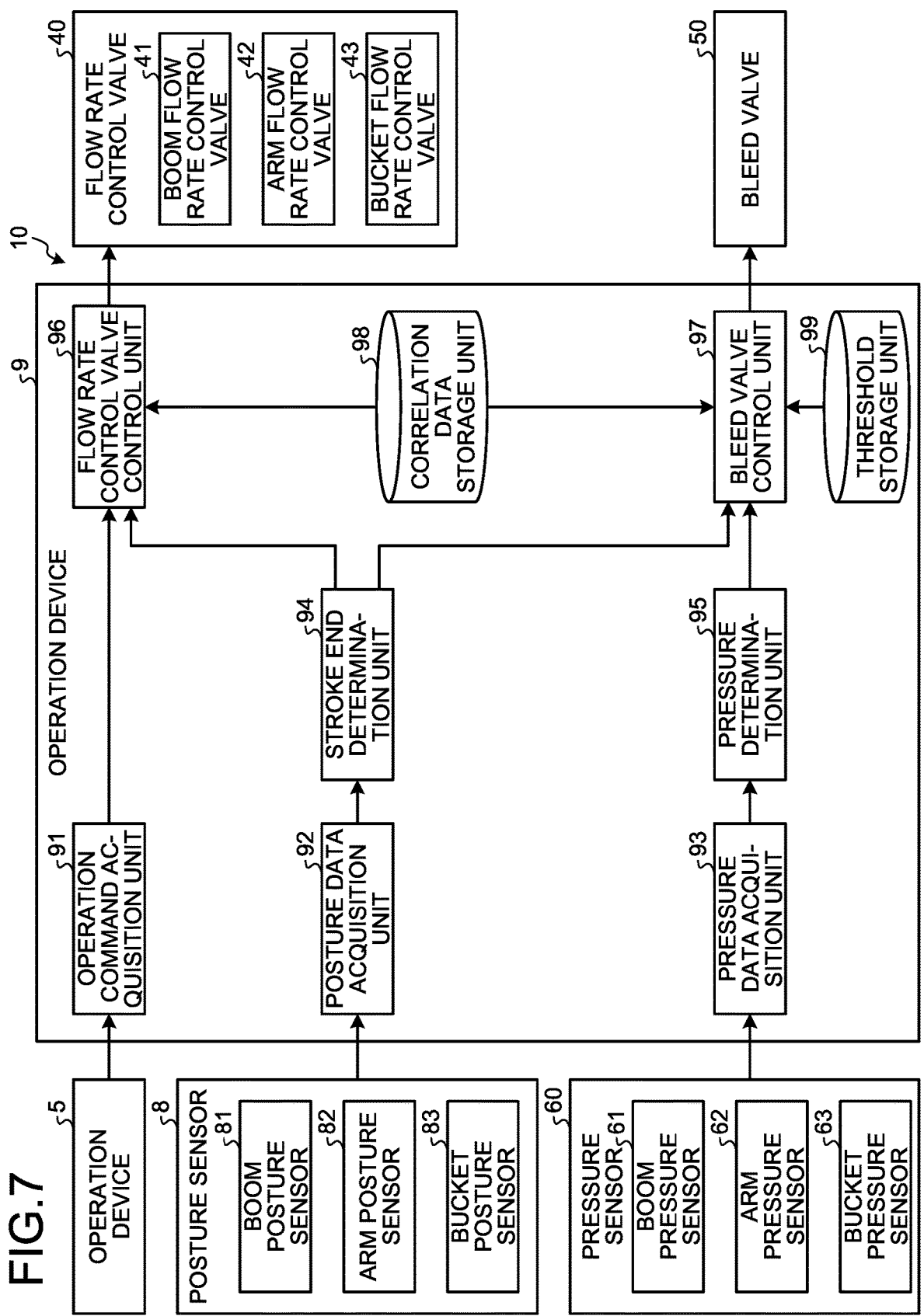
FIG. 7 is a functional block diagram illustrating a control device according to the embodiment.

FIG. 7 is a functional block diagram illustrating the control device 9 according to the embodiment. The control device 9 is connected to each of the operation device 5, the posture sensor 8, and the pressure sensor 60 via communication lines. In addition, the control device 9 is connected to each of the flow rate control valve 40 and the bleed valve 50 via control lines.

The control device 9 includes an operation command acquisition unit 91, a posture data acquisition unit 92, a pressure data acquisition unit 93, a stroke end determination unit 94, a pressure determination unit 95, a flow rate control valve control unit 96, a bleed valve control unit 97, a correlation data storage unit 98, and a threshold storage unit 99.

The operation command acquisition unit 91 acquires an operation command from the operation device 5. The operation device 5 is operated by the driver to operate the flow rate control valve 40. The operation device 5 is operated by the driver to generate an operation command for operating the flow rate control valve 40. That is, the operation device 5 is operated by the driver to generate an operation command for adjusting the flow rate of the hydraulic oil supplied to the hydraulic cylinder 2. The operation command generated by the operation device 5 is output to the control device 9. The operation command acquisition unit 91 acquires an operation command generated by the operation of the operation device 5. In the embodiment, one flow rate control valve 40 is connected to one hydraulic cylinder 2. In a case where a plurality of flow rate control valves 40 are connected to one hydraulic cylinder 2, the total flow rate of the hydraulic oil supplied from the plurality of flow rate control valves 40 is adjusted.

The posture data acquisition unit 92 acquires detection data of the posture sensor 8. The posture sensor 8 detects a posture of the working equipment element in a movable range of the working equipment element. The boom posture sensor 81 detects a posture of the boom 11 in a movable range of the boom 11. The arm posture sensor 82 detects a posture of the arm 12 in a movable range of the arm 12. The bucket posture sensor 83 detects a posture of the bucket 13 in a movable range of the bucket 13. The posture data acquisition unit 92 acquires each of the detection data of the boom posture sensor 81, the detection data of the arm posture sensor 82, and the detection data of the bucket posture sensor 83.

The pressure data acquisition unit 93 acquires detection data of the pressure sensor 60. The pressure sensor 60 detects the pressure of the hydraulic oil discharged from the hydraulic cylinder 2. The boom pressure sensor 61 detects the pressure of the hydraulic oil discharged from the boom cylinder 21. The arm pressure sensor 62 detects the pressure of the hydraulic oil discharged from the arm cylinder 22. The bucket pressure sensor 63 detects the pressure of the hydraulic oil discharged from the bucket cylinder 23. The pressure data acquisition unit 93 acquires each of the detection data of the boom pressure sensor 61, the detection data of the arm pressure sensor 62, and the detection data of the bucket pressure sensor 63.

The stroke end determination unit 94 determines whether or not the working equipment element is present in the end section including the end position of the movable range based on the detection data of the posture sensor 8 acquired by the posture data acquisition unit 92. The end position of the movable range of the working equipment element is defined based on the stroke end of the hydraulic cylinder 2. The end section of the movable range of the working equipment element is defined based on the stroke length of the hydraulic cylinder 2. The stroke end determination unit 94 can determine whether or not the working equipment element is present in the end section of the movable range based on the detection data of the posture sensor 8.

The pressure determination unit 95 determines whether or not the pressure of the hydraulic oil discharged from the hydraulic cylinder 2 is equal to or less than a threshold based on the detection data of the pressure sensor 60 acquired by the pressure data acquisition unit 93. The threshold is a predetermined value and is stored in the threshold storage unit 99. In the embodiment, the threshold is set to a value equal to the pressure of the tank 35. The pressure of the tank 35 is, for example, atmospheric pressure.

The flow rate control valve control unit 96 outputs a first control command for controlling the flow rate control valve 40. The flow rate control valve control unit 96 outputs the first control command to the flow rate control valve 40 to adjust the flow rate of the hydraulic oil supplied from the flow rate control valve 40 to the hydraulic cylinder 2 via the first flow path 33. The flow rate control valve 40 controls the flow rate of the hydraulic oil supplied to the hydraulic cylinder 2 by the movement amount of the spool. The spool is connected to the pilot line. The spool is moved by the pilot pressure of the pilot line. The pilot pressure is adjusted by an electromagnetic proportional control valve (not illustrated) disposed in the pilot line. The flow rate control valve control unit 96 outputs a command current to the electromagnetic proportional control valve as the first control command. When the command current is output to the electromagnetic proportional control valve, the pilot pressure is applied to the spool, and the spool moves. By adjusting the command current value output to the electromagnetic proportional control valve, the pilot pressure is adjusted, and the movement amount of the spool is adjusted. By adjusting the movement amount of the spool, the flow rate of the hydraulic oil supplied from the flow rate control valve 40 to the hydraulic cylinder 2 is adjusted.

The flow rate control valve control unit 96 can output a first control command for controlling the boom flow rate control valve 41, a first control command for controlling the arm flow rate control valve 42, and a first control command for controlling the bucket flow rate control valve 43. The flow rate control valve control unit 96 can adjust the flow rate of the hydraulic oil supplied from the boom flow rate control valve 41 to the boom cylinder 21 by outputting the first control command to the boom flow rate control valve 41. The flow rate control valve control unit 96 can adjust the flow rate of the hydraulic oil supplied from the arm flow rate control valve 42 to the arm cylinder 22 by outputting the first control command to the arm flow rate control valve 42. The flow rate control valve control unit 96 can adjust the flow rate of the hydraulic oil supplied from the bucket flow rate control valve 43 to the bucket cylinder 23 by outputting the first control command to the bucket flow rate control valve 43.

When the stroke end determination unit 94 determines that the working equipment element is present in the end section of the movable range and the operation command acquisition unit 91 determines that the operation command is output such that the working equipment element moves toward the end position, the flow rate control valve control unit 96 outputs the first control command for adjusting the flow rate of the hydraulic oil supplied to the hydraulic cylinder 2 to the flow rate control valve 40. When the stroke end determination unit 94 determines that the boom 11 is present in the end section of the movable range and the operation command acquisition unit 91 determines that the operation command is output such that the boom 11 moves toward the end position, the flow rate control valve control unit 96 outputs the first control command for adjusting the flow rate of the hydraulic oil supplied to the boom cylinder 21 to the boom flow rate control valve 41. When the stroke end determination unit 94 determines that the arm 12 is present in the end section of the movable range and the operation command acquisition unit 91 determines that the operation command is output such that the arm 12 moves toward the end position, the flow rate control valve control unit 96 outputs the first control command for adjusting the flow rate of the hydraulic oil supplied to the arm cylinder 22 to the arm flow rate control valve 42. When the stroke end determination unit 94 determines that the bucket 13 is present in the end section of the movable range and the operation command acquisition unit 91 determines that the operation command is output such that the bucket 13 moves toward the end position, the flow rate control valve control unit 96 outputs the first control command for adjusting the flow rate of the hydraulic oil supplied to the bucket cylinder 23 to the bucket flow rate control valve 43.

The bleed valve control unit 97 outputs a second control command for controlling the bleed valve 50. The bleed valve control unit 97 outputs the second control command to the bleed valve 50 to adjust the flow rate of the hydraulic oil discharged from the bleed valve 50 to the tank 35 via the second flow path 34. The bleed valve 50 controls the flow rate of the hydraulic oil discharged to the tank 35 by the movement amount of the spool. The spool is connected to the pilot line. The spool is moved by the pilot pressure of the pilot line. The pilot pressure is adjusted by an electromagnetic proportional control valve (not illustrated) disposed in the pilot line. The bleed valve control unit 97 outputs a command current to the electromagnetic proportional control valve as the second control command. When the command current is output to the electromagnetic proportional control valve, the pilot pressure is applied to the spool, and the spool moves. By adjusting the command current value output to the electromagnetic proportional control valve, the pilot pressure is adjusted, and the movement amount of the spool is adjusted. By adjusting the movement amount of the spool, the flow rate of the hydraulic oil supplied from the bleed valve 50 to the tank 35 is adjusted.

When the stroke end determination unit 94 determines that the working equipment element is present in the end section of the movable range and the operation command acquisition unit 91 determines that the operation command is output such that the working equipment element moves toward the end position, the bleed valve control unit 97 outputs the second control command for adjusting the flow rate of the hydraulic oil discharged to the tank 35 to the bleed valve 50. When the stroke end determination unit 94 determines that the boom 11 is present in the end section of the movable range and the operation command acquisition unit 91 determines that the operation command is output such that the boom 11 moves toward the end position, the bleed valve control unit 97 outputs the second control command for adjusting the flow rate of the hydraulic oil discharged to the tank 35 to the bleed valve 50. When the stroke end determination unit 94 determines that the arm 12 is present in the end section of the movable range and the operation command acquisition unit 91 determines that the operation command is output such that the arm 12 moves toward the end position, the bleed valve control unit 97 outputs the second control command for adjusting the flow rate of the hydraulic oil discharged to the tank 35 to the bleed valve 50. When the stroke end determination unit 94 determines that the bucket 13 is present in the end section of the movable range and the operation command acquisition unit 91 determines that the operation command is output such that the bucket 13 moves toward the end position, the bleed valve control unit 97 outputs the second control command for adjusting the flow rate of the hydraulic oil discharged to the tank 35 to the bleed valve 50.

The correlation data storage unit 98 stores first correlation data indicating the relationship between the operation command of the operation device 5 and the flow rate of the hydraulic oil supplied to the hydraulic cylinder 2 via the flow rate control valve 40. In addition, the correlation data storage unit 98 stores second correlation data indicating the relationship between the operation command of the operation device 5 and the flow rate of the hydraulic oil discharged to the tank 35 via the bleed valve 50. The operation command of the operation device 5 includes an operation amount of the operation device 5. When the operation device 5 includes an operating lever, the operation amount of the operation device 5 includes the inclination angle of the operating lever. Each of the first correlation data and the second correlation data is determined in advance.

The threshold storage unit 99 stores a threshold related to the pressure of the hydraulic oil discharged from the hydraulic cylinder 2. As described above, the threshold is a predetermined value. In the embodiment, the threshold is set to a value equal to the pressure of the tank 35. The pressure of the tank 35 is, for example, atmospheric pressure.

[Operation of Control Device]

Figure 8:
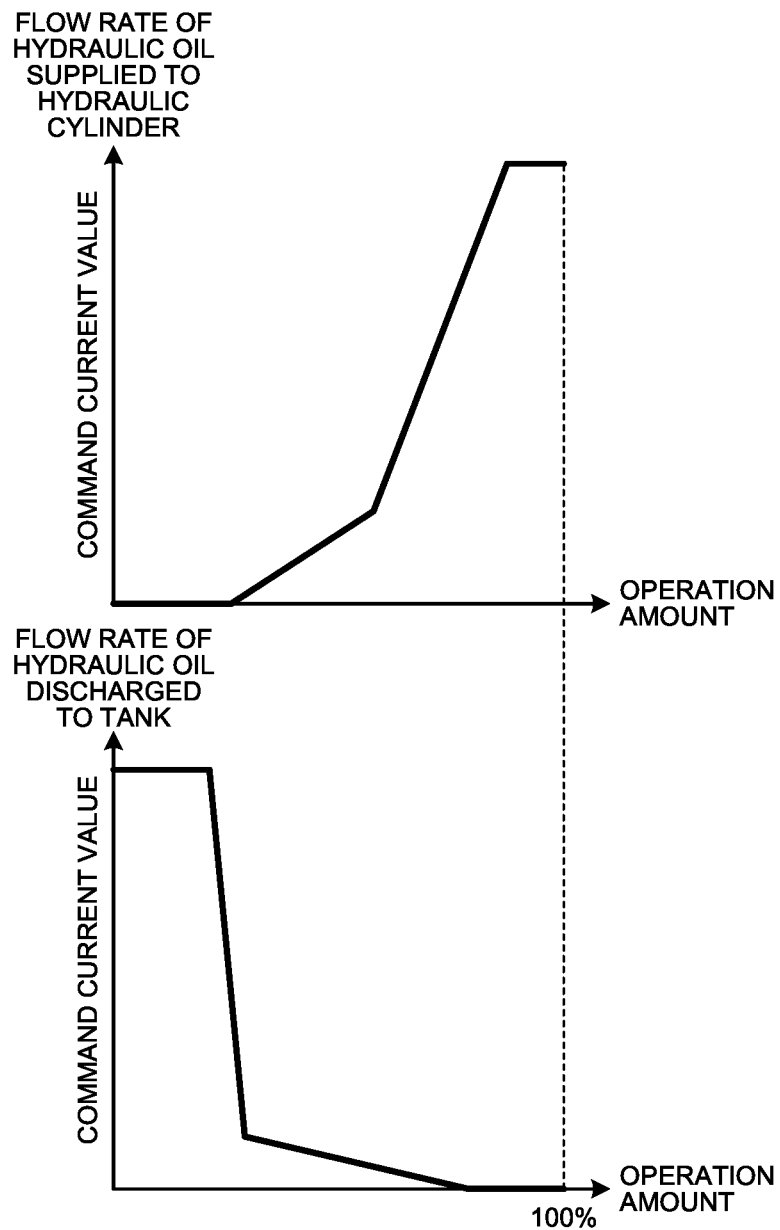
FIG. 8 is a diagram for explaining operations of the control device when the working equipment element according to the embodiment is present in an intermediate section.

Next, the operation of the control device 9 according to the embodiment will be described. As described above, the movable range of the working equipment element includes the end section and the intermediate section. FIG. 8 is a diagram for explaining the operation of the control device 9 when the working equipment element according to the embodiment is present in the intermediate section and when the working equipment element is present in the end section and moves in a direction away from the end position.

When the working equipment element is present in the intermediate section and when the working equipment element is present in the end section and moves in the direction away from the end position, the flow rate control valve control unit 96 outputs the first control command to the flow rate control valve 40 based on the operation command of the operation device 5 acquired by the operation command acquisition unit 91 and the first correlation data stored in the correlation data storage unit 98. In addition, when the working equipment element is present in the intermediate section and when the working equipment element is present in the end section and moves in the direction away from the end position, the bleed valve control unit 97 outputs the second control command to the bleed valve 50 based on the operation command of the operation device 5 acquired by the operation command acquisition unit 91 and the second correlation data stored in the correlation data storage unit 98.

As illustrated in FIG. 8, first correlation data indicating the relationship between the operation command of the operation device 5 and the flow rate of the hydraulic oil supplied to the hydraulic cylinder 2 via the flow rate control valve 40 is determined in advance. In addition, second correlation data indicating the relationship between the operation command of the operation device 5 and the flow rate of the hydraulic oil discharged to the tank 35 via the bleed valve 50 is determined in advance. The first correlation data and the second correlation data are stored in the correlation data storage unit 98.

As described above, the operation command of the operation device 5 includes the operation amount of the operation device 5. When the operation amount of the operation device 5 indicates the maximum value, the operation amount is 100[%]. When the operation device 5 is not operated, the operation amount is 0[%].

The flow rate control valve control unit 96 outputs the first control command for adjusting the flow rate of the hydraulic oil supplied to the hydraulic cylinder 2 via the flow rate control valve 40 based on the operation amount of the operation device 5 and the first correlation data stored in the correlation data storage unit 98. As described above, the first control command includes the command current value output to the electromagnetic proportional control valve that adjusts the movement amount of the spool of the flow rate control valve 40.

As illustrated in FIG. 8, the first correlation data is determined such that the command current value decreases as the operation amount of the operation device 5 decreases, and the command current value increases as the operation amount of the operation device 5 increases. That is, the first correlation data is determined such that the aperture ratio of the flow rate control valve 40 decreases as the operation amount of the operation device 5 decreases, and the aperture ratio of the flow rate control valve 40 increases as the operation amount of the operation device 5 increases. In other words, the first correlation data is determined such that the flow rate of the hydraulic oil supplied to the hydraulic cylinder 2 via the flow rate control valve 40 decreases as the operation amount of the operation device 5 decreases, and the flow rate of the hydraulic oil supplied to the hydraulic cylinder 2 via the flow rate control valve 40 increases as the operation amount of the operation device 5 increases. In the embodiment, the aperture ratio of one flow rate control valve 40 is illustrated. In a case where a plurality of flow rate control valves 40 are used, the aperture ratio of each flow rate control valve 40 may be controlled so as to ensure a desired flow rate of the hydraulic oil.

When the working equipment element is present in the intermediate section and when the working equipment element is present in the end section and moves in the direction away from the end position, the flow rate control valve control unit 96 outputs the command current value as the first control command based on the operation amount of the operation device 5 and the first correlation data such that the flow rate of the hydraulic oil supplied to the hydraulic cylinder 2 via the flow rate control valve 40 decreases as the operation amount of the operation device 5 decreases, and the flow rate of the hydraulic oil supplied to the hydraulic cylinder 2 via the flow rate control valve 40 increases as the operation amount of the operation device 5 increases.

The bleed valve control unit 97 outputs the second control command for adjusting the flow rate of the hydraulic oil discharged from the bleed valve 50 to the tank 35 based on the operation amount of the operation device 5 and the second correlation data stored in the correlation data storage unit 98. As described above, the second control command includes the command current value output to the electromagnetic proportional control valve that adjusts the movement amount of the spool of the bleed valve 50.

As illustrated in FIG. 8, the second correlation data is determined such that the command current value increases as the operation amount of the operation device 5 decreases, and the command current value decreases as the operation amount of the operation device 5 increases. That is, the second correlation data is determined such that the aperture ratio of the flow rate control valve 40 increases as the operation amount of the operation device 5 decreases, and the aperture ratio of the flow rate control valve 40 decreases as the operation amount of the operation device 5 increases. In other words, the second correlation data is determined such that the flow rate of the hydraulic oil discharged to the tank 35 via the bleed valve 50 increases as the operation amount of the operation device 5 decreases, and the flow rate of the hydraulic oil discharged to the tank 35 via the bleed valve 50 decreases as the operation amount of the operation device 5 increases.

When the working equipment element is present in the intermediate section and when the working equipment element is present in the end section and moves in the direction away from the end position, the bleed valve control unit 97 outputs the command current value as the second control command based on the operation amount of the operation device 5 and the second correlation data such that the flow rate of the hydraulic oil discharged to the tank 35 via the bleed valve 50 increases as the operation amount of the operation device 5 decreases, and the flow rate of the hydraulic oil discharged to the tank 35 via the bleed valve 50 decreases as the operation amount of the operation device 5 increases.

When the working equipment element is present in the intermediate section and when the working equipment element is present in the end section and moves in the direction away from the end position, each of the flow rate control valve 40 and the bleed valve 50 is controlled such that the flow rate of the hydraulic oil supplied to the hydraulic cylinder 2 via the flow rate control valve 40 decreases and the flow rate of the hydraulic oil discharged to the tank 35 via the bleed valve 50 increases as the operation amount of the operation device 5 decreases. In a case where the working equipment element is present in the intermediate section and in a case where the working equipment element is present in the end section and moves in the direction away from the end portion, when the operation amount of the operation device 5 is small, the hydraulic oil discharged from the hydraulic pump 32 is discharged exclusively to the tank 35. Therefore, an excessive increase in the pump pressure indicating the pressure of the hydraulic oil discharged from the hydraulic pump 32 is suppressed. In addition, when the operation amount of the operation device 5 is 0[%], the aperture ratio of the flow rate control valve 40 is 0[%], and the aperture ratio of the bleed valve 50 is 100[%]. Therefore, the hydraulic oil discharged from the hydraulic pump 32 is not supplied to the hydraulic cylinder 2, but is discharged to the tank 35 via the second flow path 34 and the bleed valve 50.

When the working equipment element is present in the intermediate section and when the working equipment element is present in the end section and moves in the direction away from the end portion, each of the flow rate control valve 40 and the bleed valve 50 is controlled such that the flow rate of the hydraulic oil supplied to the hydraulic cylinder 2 via the flow rate control valve 40 increases and the flow rate of the hydraulic oil discharged to the tank 35 via the bleed valve 50 decreases as the operation amount of the operation device 5 increases. In a case where the working equipment element is present in the intermediate section and in a case where the working equipment element is present in the end section and moves in the direction away from the end portion, when the operation amount of the operation device 5 is large, the hydraulic oil discharged from the hydraulic pump 32 is exclusively supplied to the hydraulic cylinder 2. In addition, when the operation amount of the operation device 5 is 100[%], the aperture ratio of the flow rate control valve 40 is 100[%], and the aperture ratio of the bleed valve 50 is 0[%]. Therefore, the hydraulic oil discharged from the hydraulic pump 32 is not discharged to the tank 35 but is supplied to the hydraulic cylinder 2 via the first flow path 33 and the flow rate control valve 40.

Figure 9:
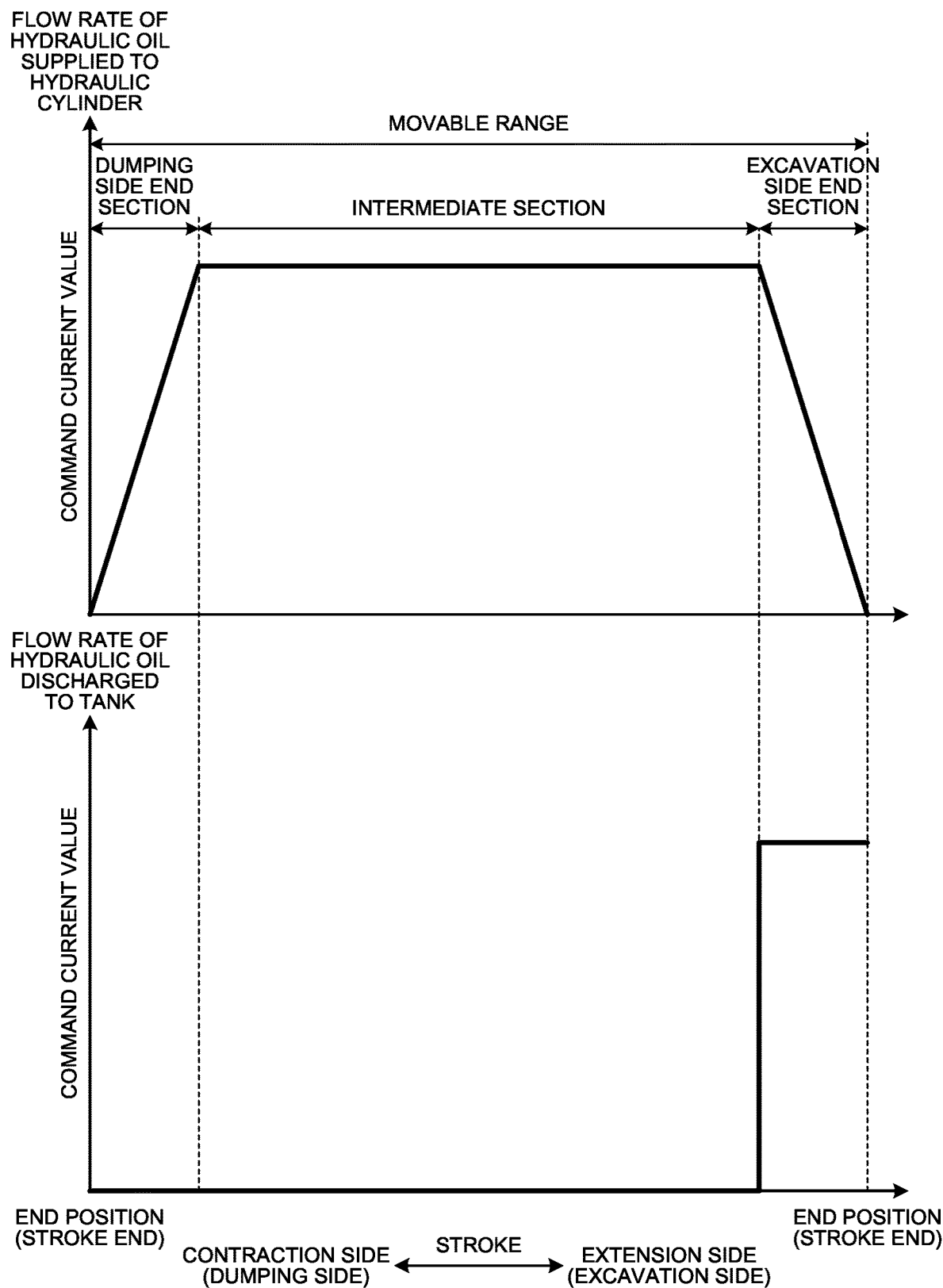
FIG. 9 is a diagram for explaining operations of the working equipment element and a hydraulic cylinder according to the embodiment.

FIG. 9 is a diagram for explaining the operations of the working equipment element and the hydraulic cylinder 2 according to the embodiment. In the description using FIG. 9, an example in which the working equipment element is the arm 12 and the hydraulic cylinder 2 is the arm cylinder 22 will be described. Note that the same applies to the case where the working equipment element is the boom 11 or the bucket 13.

FIG. 9 illustrates a relationship between the position of the arm 12 and the flow rate of the hydraulic oil when the arm 12 moves toward the end position in the movable range of the arm 12 when the operation amount of the operation device 5 is 100[%]. In addition, FIG. 9 illustrates a relationship between the position of the arm 12 in the movable range and the flow rate of the hydraulic oil when the pressure of the hydraulic oil discharged from the arm cylinder 22 exceeds the threshold.

The arm 12 performs the dumping operation and the excavation operation by the arm cylinder 22. The movable range of the arm 12 includes the end section and the intermediate space different from the end section. The end section of the arm 12 includes a dumping side end section including a dumping side end position of the arm 12 when the arm 12 finishes the dumping operation, and an excavation side end section including an excavation side end position of the arm 12 when the arm 12 finishes the excavation operation.

When the stroke end determination unit 94 determines that the arm 12 is present in the intermediate section, and when the arm 12 is present in the end section and the operation command acquisition unit 91 determines that the operation command is output such that the arm 12 moves away from the end position, the flow rate control valve control unit 96 outputs the first control command such that the flow rate of the hydraulic oil supplied from the arm flow rate control valve 42 to the arm cylinder 22 is adjusted based on the operation command of the operation device 5 and the first correlation data. In the example illustrated in FIG. 9, since the operation amount of the operation device 5 is 100[%], the flow rate control valve control unit 96 outputs the first control command such that the aperture ratio of the arm flow rate control valve 42 becomes 100[%]. Since the aperture ratio of the arm flow rate control valve 42 is adjusted to 100[%], the hydraulic oil is supplied from the arm flow rate control valve 42 to the arm cylinder 22 at the maximum flow rate.

When the stroke end determination unit 94 determines that the arm 12 is present in the intermediate section, and when the arm 12 is present in the end section and the operation command acquisition unit 91 determines that the operation command is output such that the arm 12 moves away from the end position, the bleed valve control unit 97 outputs the second control command such that the flow rate of the hydraulic oil discharged from the bleed valve 50 to the tank 35 is adjusted based on the operation command of the operation device 5 and the second correlation data. In the example illustrated in FIG. 9, since the operation amount of the operation device 5 is 100[%], the bleed valve control unit 97 outputs the second control command such that the aperture ratio of the bleed valve 50 becomes 0[%]. Since the aperture ratio of the bleed valve 50 is adjusted to 0[%], the hydraulic oil is not discharged from the bleed valve 50 to the tank 35.

When the stroke end determination unit 94 determines that the arm 12 is present in the end section (the dumping side end section and the excavation side end section) and the operation command acquisition unit 91 determines that the operation command is output such that the arm 12 moves toward the end position, the flow rate control valve control unit 96 outputs the first control command such that the flow rate of the hydraulic oil supplied from the arm flow rate control valve 42 to the arm cylinder 22 decreases.

When it is determined that the arm 12 is present in the end section and it is determined that the operation command is output such that the arm 12 moves toward the end position, the flow rate control valve control unit 96 outputs the first control command such that the flow rate of the hydraulic oil supplied to the arm cylinder 22 becomes smaller than the flow rate of the hydraulic oil designated by the operation command of the operation device 5. In the example illustrated in FIG. 9, although the operation amount of the operation device 5 is 100[%], when it is determined that the arm 12 is present in the end section and the arm 12 moves toward the end position, the flow rate control valve control unit 96 outputs the first control command such that the flow rate of the hydraulic oil supplied to the arm cylinder 22 becomes smaller than the maximum flow rate. When it is determined that the arm 12 is present in the end section and the arm 12 moves toward the end position, the flow rate control valve control unit 96 outputs the first control command such that the aperture ratio of the arm flow rate control valve 42 gradually decreases from, for example, 100[%] to 0[%]. Note that the reduction rate of the aperture ratio may be a fixed value regardless of the operation amount of the operation device 5, or may be a variable value that changes according to the operation amount.

That is, the flow rate control valve control unit 96 outputs the first control command such that the flow rate of the hydraulic oil when it is determined that the arm 12 is present in the end section and it is determined that the operation command is output such that the arm 12 moves toward the end position in a case where the operation amount of the operation device 5 is constant becomes smaller than the flow rate of the hydraulic oil when the arm 12 is present in the intermediate section and when it is determined that the arm 12 is present in the end section and the operation command is output such that the arm 12 moves away from the end position. That is, even if the operation amount of the operation device 5 is constant at 100[%], when it is determined that the arm 12 is present in the end section and it is determined that the operation command is output such that the arm 12 moves toward the end position, the flow rate control valve control unit 96 outputs the first control command such that the flow rate of the hydraulic oil supplied to the arm cylinder 22 becomes smaller than the maximum flow rate.

When it is determined that the arm 12 is present in the excavation side end section and it is determined that the operation command is output such that the arm 12 moves toward the excavation side end position, the first control command is output such that the flow rate of the hydraulic oil supplied from the arm flow rate control valve 42 to the arm cylinder 22 decreases, whereby the rod (piston) is decelerated when the rod of the arm cylinder 22 approaches the stroke end. That is, when it is determined that the arm 12 is present in the end section and the arm 12 moves in the direction toward the end position, the cushion control is performed. Performing the cushion control reduces the impact when the rod of the arm cylinder 22 reaches the stroke end.

When the stroke end determination unit 94 determines that the arm 12 is present in the excavation side end section and the operation command acquisition unit 91 determines that the operation command is output such that the arm 12 moves toward the excavation side end position, the bleed valve control unit 97 outputs the second control command such that the flow rate of the hydraulic oil discharged from the bleed valve 50 to the tank 35 increases.

When it is determined that the arm 12 is present in the excavation side end section and it is determined that the operation command is output such that the arm 12 moves toward the excavation side end position, the bleed valve control unit 97 outputs the second control command such that the flow rate of the hydraulic oil discharged to the tank 35 becomes larger than the flow rate of the hydraulic oil designated by the operation command of the operation device 5. In the example illustrated in FIG. 9, although the operation amount of the operation device 5 is 100[%], when it is determined that the arm 12 is present in the excavation side end section and it is determined that the operation command is output such that the arm 12 moves toward the excavation side end position, the bleed valve control unit 97 outputs the second control command such that the flow rate of the hydraulic oil discharged to the tank 35 becomes larger than 0. When it is determined that the arm 12 is present in the excavation side end section and it is determined that the operation command is output such that the arm 12 moves toward the excavation side end position, the bleed valve control unit 97 outputs the second control command such that the aperture ratio of the bleed valve 50 becomes, for example, 100[%].

That is, the bleed valve control unit 97 outputs the second control command such that the flow rate of the hydraulic oil when it is determined that the arm 12 is present in the excavation side end section and it is determined that the operation command is output such that the arm 12 moves toward the excavation side end position in a case where the operation amount of the operation device 5 is constant becomes larger than the flow rate of the hydraulic oil when the arm 12 is present in the intermediate section and when it is determined that the arm 12 is present in the end section and the operation command is output such that the arm 12 moves away from the end position. That is, even if the operation amount of the operation device 5 is constant at 100[%], when it is determined that the arm 12 is present in the excavation side end section and it is determined that the operation command is output such that the arm 12 moves toward the excavation side end position, the bleed valve control unit 97 outputs the second control command such that the flow rate of the hydraulic oil discharged to the tank 35 becomes larger than 0.

When the cushion control is performed in a state where the aperture ratio of the bleed valve 50 is 0[%], there is a possibility that the pump pressure indicating the pressure of the hydraulic oil discharged from the hydraulic pump 32 rapidly increases. When the pump pressure rapidly increases, the flow force may act on the arm flow rate control valve 42. When the flow force acts on the arm flow rate control valve 42, there is a possibility that the hydraulic oil supplied from the arm flow rate control valve 42 to the arm cylinder 22 is supplied at a flow rate different from the target value in the cushion control. As a result, the arm 12 may operate at a velocity different from the target value, and an appropriate cushion effect may not be obtained. If an appropriate cushion effect cannot be obtained, operability of the working equipment 1 deteriorates.

In particular, when performing the excavation operation, the arm 12 moves from the intermediate section toward the excavation side end section by not only the power of the arm cylinder 22 but also the action of gravity (own weight). Therefore, since the pump pressure tends to rapidly increase, the possibility that the flow force acts on the arm flow rate control valve 42 increases.

In the embodiment, when the cushion control is performed, that is, when the arm 12 moves toward the excavation side end section and the flow rate of the hydraulic oil supplied to the arm cylinder 22 decreases, the bleed valve control unit 97 increases the aperture ratio of the bleed valve 50. As a result, at least a part of the hydraulic oil discharged from the hydraulic pump 32 is discharged to the tank 35 via the bleed valve 50. Therefore, a rapid increase in the pump pressure is suppressed. Therefore, the flow force is suppressed from acting on the arm flow rate control valve 42, and an appropriate cushion effect can be obtained. Since an appropriate cushion effect can be obtained, deterioration of operability of the working equipment 1 is suppressed.

Note that, in the example illustrated in FIG. 9, when it is determined that the arm 12 is present in the dumping side end section and the operation command is output such that the arm 12 moves toward the dumping side end position, the bleed valve control unit 97 outputs the second control command based on the operation command of the operation device 5 and the second correlation data. Note that, when it is determined that the arm 12 is present in the dumping side end section and the operation command is output such that the arm 12 moves toward the dumping side end position, the bleed valve control unit 97 may output the second control command such that the flow rate of the hydraulic oil discharged to the tank 35 becomes larger than the flow rate designated by the operation command of the operation device 5. In addition, in the example illustrated in FIG. 9, the command current value when the operation amount of the operation device 5 is 100[%] is illustrated. When the operation amount is other than 100[%], the command current value is smaller than the value illustrated in FIG. 9.

Figure 10:
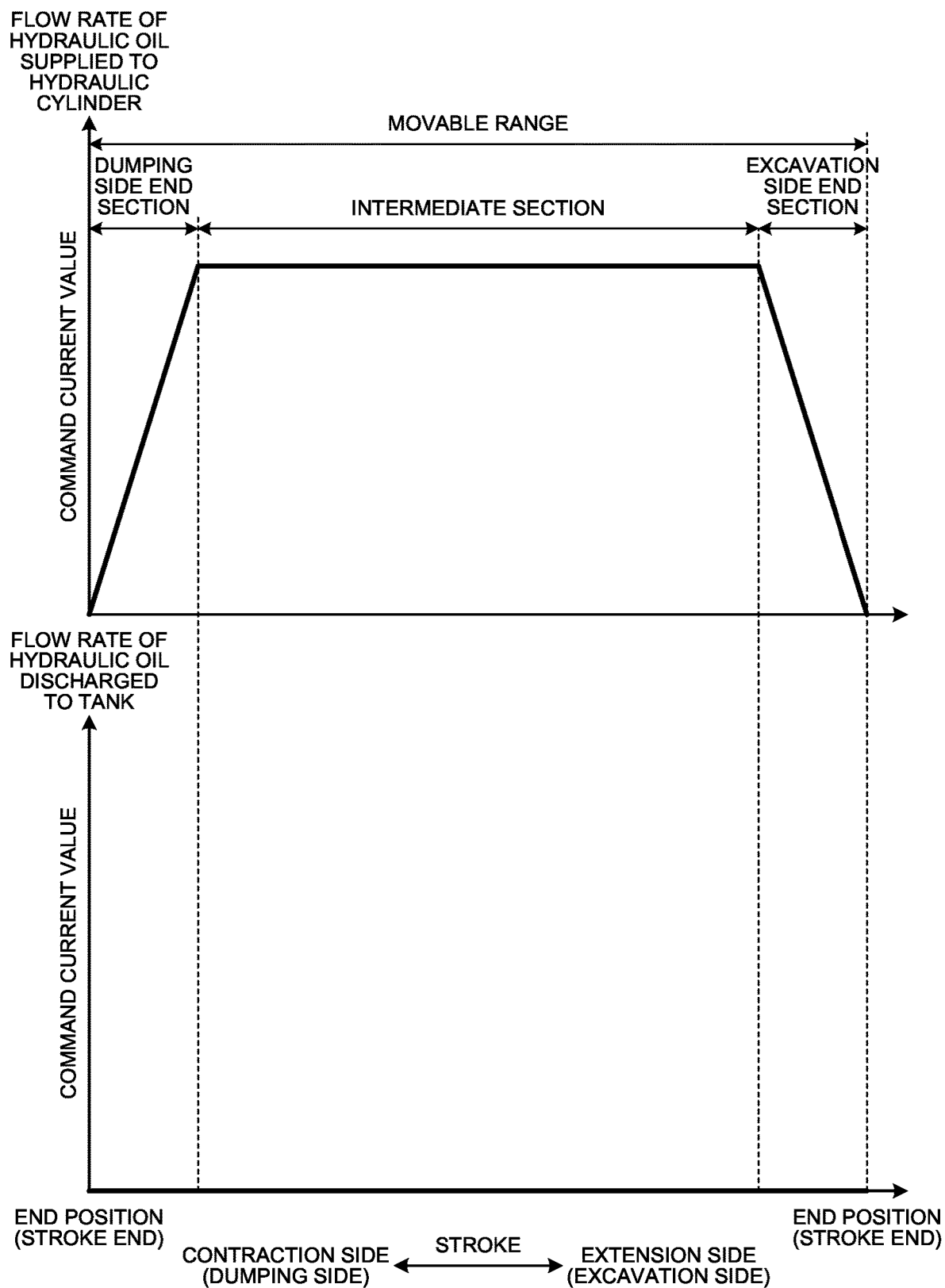
FIG. 10 is a diagram for explaining operations of the working equipment element and the hydraulic cylinder according to the embodiment.

FIG. 10 is a diagram for explaining the operation of the working equipment element and the hydraulic cylinder 2 according to the embodiment. In the description using FIG. 10, an example in which the working equipment element is the arm 12 and the hydraulic cylinder 2 is the arm cylinder 22 will be described.

FIG. 10 illustrates the relationship between the position in the movable range of the arm 12 and the flow rate of the hydraulic oil when the operation amount of the operation device 5 is 100[%]. In addition, FIG. 10 illustrates the relationship between the position of the arm 12 in the movable range and the flow rate of the hydraulic oil when the pressure of the hydraulic oil discharged from the arm cylinder 22 is equal to or less than the threshold.

The arm pressure sensor 62 detects the pressure of the hydraulic oil discharged from the arm cylinder 22. The pressure data acquisition unit 93 acquires detection data of the arm pressure sensor 62. The bleed valve control unit 97 outputs the second control command to the bleed valve 50 based on the detection data of the arm pressure sensor 62 acquired by the pressure data acquisition unit 93.

When the pressure determination unit 95 determines that the pressure of the hydraulic oil discharged from the arm cylinder 22 is equal to or less than the threshold based on the detection data of the arm pressure sensor 62, the bleed valve control unit 97 outputs the second control command such that the flow rate of the hydraulic oil discharged from the bleed valve 50 to the tank 35 decreases even when the stroke end determination unit 94 determines that the arm 12 is present in the end section and the operation command acquisition unit 91 determines that the operation command is output such that the arm 12 moves toward the end position.

When it is determined that the pressure of the hydraulic oil discharged from the arm cylinder 22 is equal to or less than the threshold, even if it is determined that the arm 12 is present in the end section and the operation command is output such that the arm 12 moves toward the end position, the bleed valve control unit 97 outputs the second control command such that the flow rate of the hydraulic oil discharged from the bleed valve 50 to the tank 35 becomes smaller than the flow rate of the hydraulic oil discharged from the bleed valve 50 to the tank 35 when it is determined that the pressure of the hydraulic oil discharged from the arm cylinder 22 exceeds the threshold. The bleed valve control unit 97 outputs the second control command such that the aperture ratio of the bleed valve 50 becomes, for example, 0[%].

For example, before work using the working equipment 1 is performed, a process of warming the hydraulic oil may be performed. The process of warming the hydraulic oil includes a process of circulating the hydraulic oil among the hydraulic pump 32, the discharge flow path 33B, and the tank 35 by driving the hydraulic pump 32 in a state where all rods of the hydraulic cylinder 2 including the arm cylinder 22 are disposed at the stroke end and all the flow rate control valves 40 including the arm flow rate control valve 42 are disposed at the stop position P3. Therefore, when the process of warming the hydraulic oil is performed, it is necessary to increase the pump pressure such that the relief valve 56 disposed in the discharge flow path 33B opens. If the bleed valve 50 is opened when the process of warming the hydraulic oil is performed, it is difficult to increase the pump pressure.

When the process of warming the hydraulic oil is performed, the flow rate control valve 40 is disposed at the stop position P3. Therefore, the pressure of the hydraulic oil discharged from the hydraulic cylinder 2 decreases and becomes equal to, for example, the pressure of the tank 35. When it is determined that the pressure of the hydraulic oil discharged from the arm cylinder 22 is equal to or less than the threshold, the bleed valve control unit 97 outputs the second control command to close the bleed valve 50. When the bleed valve 50 is closed, the pump pressure increases when the process of warming the hydraulic oil is performed. Therefore, the process of warming the hydraulic oil is smoothly performed.

In addition, in the work using the working equipment 1, when the excavation operation is performed in a state where the arm 12 is disposed in the excavation side end section, if the aperture ratio of the bleed valve 50 is 100[%], the pump pressure may be excessively decreased, and the flow rate of the hydraulic oil supplied to the arm cylinder 22 via the arm flow rate control valve 42 may be insufficient. As a result, there is a possibility that the excavation force of the arm 12 decreases.

When the flow rate of the hydraulic oil supplied to the arm cylinder 22 is insufficient and the excavation force of the arm 12 decreases, the pressure of the hydraulic oil discharged from the arm cylinder 22 decreases.

In a case where it is determined that there is a possibility that the pressure of the hydraulic oil discharged from the arm cylinder 22 becomes equal to or less than the threshold and the excavation force of the arm 12 decreases when the arm 12 is operated in the excavation side end section, the bleed valve control unit 97 outputs the second control command so as to close the bleed valve 50. When the bleed valve 50 is closed, the pump pressure increases. Therefore, the hydraulic oil is sufficiently supplied to the arm cylinder 22 via the arm flow rate control valve 42. Therefore, a decrease in the excavation force of the arm 12 is suppressed.

[Work Machine Control Method]

Figure 11:
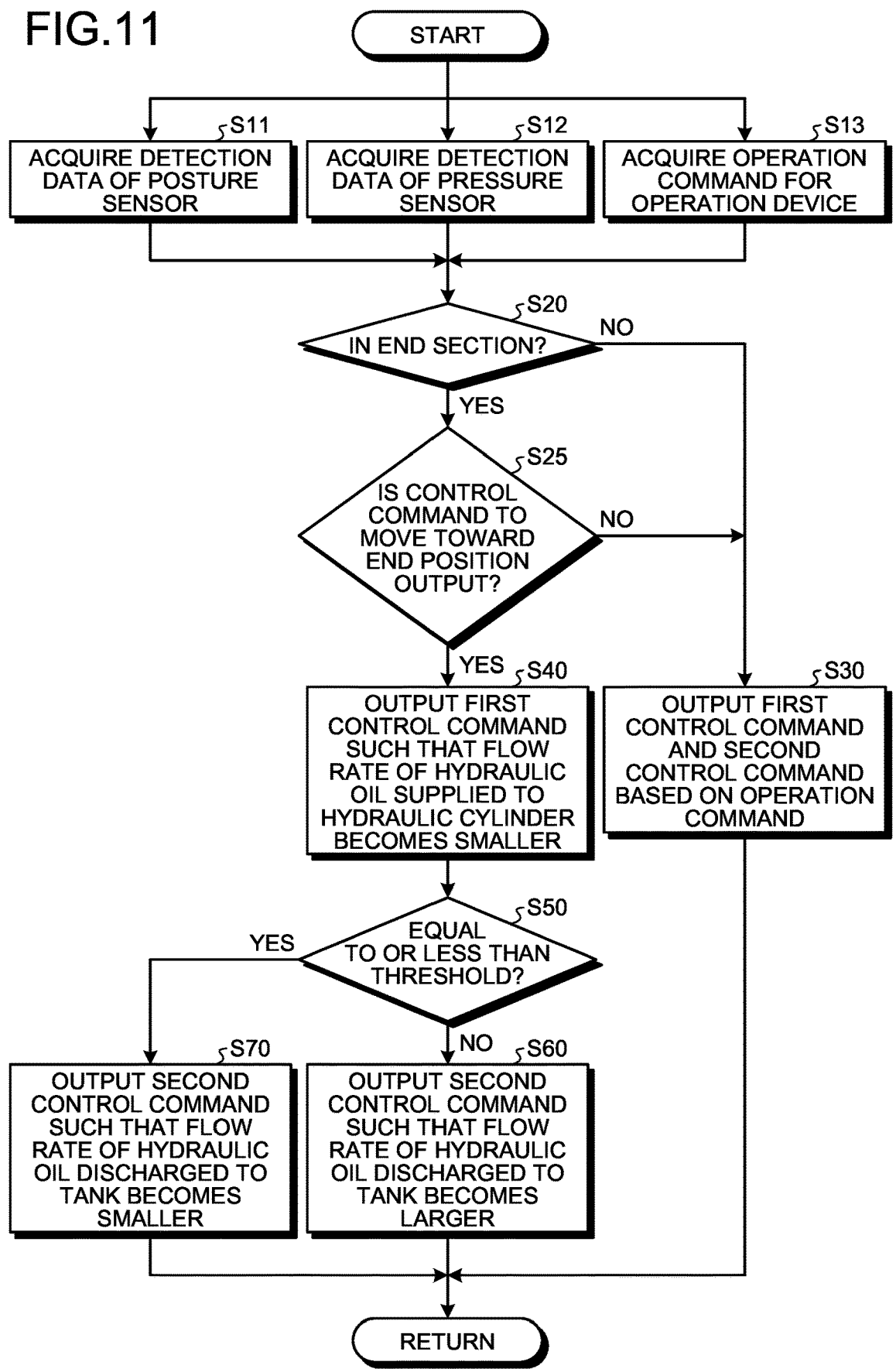
FIG. 11 is a flowchart illustrating a work machine control method according to the embodiment.

FIG. 11 is a flowchart illustrating a method of controlling the excavator 100 according to the embodiment. In the description using FIG. 11, a method of controlling the arm 12 and the arm cylinder 22 will be mainly described.

The driver operates the operation device 5 to drive the arm cylinder 22. The arm cylinder 22 operates the arm 12 in the movable range.

The arm posture sensor 82 detects the posture of the arm 12 in the movable range. The posture data acquisition unit 92 acquires detection data of the arm posture sensor 82 (Step S11). The arm pressure sensor 62 detects the pressure of the hydraulic oil discharged from the arm cylinder 22. The pressure data acquisition unit 93 acquires detection data of the arm pressure sensor 62 (Step S12). The operation command acquisition unit 91 acquires an operation command for the operation device 5 (Step S13).

The stroke end determination unit 94 determines whether or not the arm 12 is present in the end section based on the detection data of the arm posture sensor 82 (Step S20).

When it is determined in Step S20 that the arm 12 is not present in the end section (Step S20: No), the flow rate control valve control unit 96 outputs the first control command to the arm flow rate control valve 42 such that the arm 12 operates according to the operation command of the operation device 5 based on the operation command of the operation device 5 and the first correlation data. In addition, the bleed valve control unit 97 outputs the second control command to the bleed valve 50 based on the operation command of the operation device 5 and the second correlation data (Step S30).

When it is determined in Step S20 that the arm 12 is present in the end section (Step S20: Yes), the operation command acquisition unit 91 determines whether or not an operation command to move the arm 12 toward the end position is output from the operation device 5 (Step S25).

When it is determined in Step S25 that the operation command to move the arm 12 toward the end position has not been output (Step S25: No), the flow rate control valve control unit 96 outputs the first control command to the arm flow rate control valve 42 such that the arm 12 operates according to the operation command of the operation device 5 based on the operation command of the operation device 5 and the first correlation data. In addition, the bleed valve control unit 97 outputs the second control command to the bleed valve 50 based on the operation command of the operation device 5 and the second correlation data (Step S30).

When it is determined in Step S25 that the operation command to move the arm 12 toward the end position has been output (Step S25: Yes), the flow rate control valve control unit 96 outputs the first control command to the arm flow rate control valve 42 such that the flow rate of the hydraulic oil supplied to the arm cylinder 22 via the arm flow rate control valve 42 becomes smaller than the flow rate of the hydraulic oil designated by the operation command of the operation device 5 (Step S40).

The pressure determination unit 95 determines whether or not the pressure of the hydraulic oil discharged from the arm cylinder 22 is equal to or less than a threshold based on the detection data of the arm pressure sensor 62 (Step S50).

When it is determined in Step S50 that the pressure of the hydraulic oil discharged from the arm cylinder 22 is not equal to or less than the threshold (Step S50: No), the bleed valve control unit 97 outputs the second control command to the bleed valve 50 such that the flow rate of the hydraulic oil discharged to the tank 35 via the bleed valve 50 becomes larger than the flow rate of the hydraulic oil designated by the operation command of the operation device 5 (Step S60).

When it is determined in Step S50 that the pressure of the hydraulic oil discharged from the arm cylinder 22 is equal to or less than the threshold (Step S50: Yes), the bleed valve control unit 97 outputs the second control command to the bleed valve 50 such that the flow rate of the hydraulic oil discharged to the tank 35 via the bleed valve 50 decreases even when the arm 12 is present in the end section and the operation command acquisition unit 91 determines that the operation command has been output such that the arm 12 moves toward the end position. The bleed valve control unit 97 outputs the second control command such that the aperture ratio of the bleed valve 50 becomes 0[%] (Step S70).

[Computer System]

Figure 12:
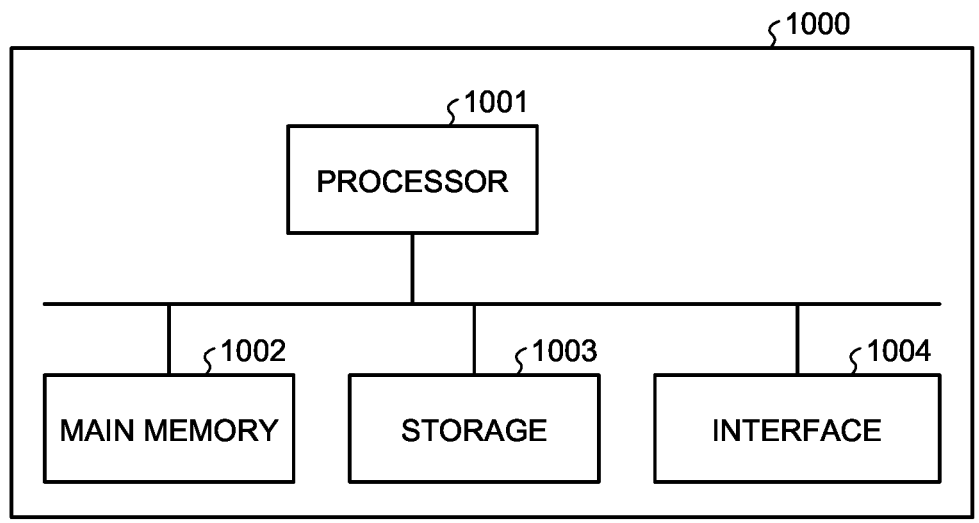
FIG. 12 is a block diagram illustrating a computer system according to the embodiment.

FIG. 12 is a block diagram illustrating a computer system 1000 according to the embodiment. The control device 9 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The function of the control device 9 is stored in the storage 1003 as a computer program. The processor 1001 reads the computer program from the storage 1003, develops the computer program in the main memory 1002, and executes the above-described processing according to the computer program. Note that the computer program may be distributed to the computer system 1000 via a network.

According to the above-described embodiment, the computer program can execute: operating the working equipment element in the movable range by the hydraulic cylinder 2; detecting the posture of the working equipment element in the movable range; and adjusting the flow rate of the hydraulic oil supplied to the hydraulic cylinder via the first flow path connected to the hydraulic pump and adjusting the flow rate of the hydraulic oil discharged to the tank via the second flow path branching from the first flow path when it is determined that the working equipment element is present in the end section including the end position of the movable range based on the detection data of the posture of the working equipment element.

[Effects]

As described above, according to the embodiment, the first flow path 33 connected to the hydraulic pump 32 and the second flow path 34 branching from the first flow path 33 are provided. By arranging the flow rate control valve 40 at the first operation position P1 or the second operation position P2, the hydraulic oil discharged from the hydraulic pump 32 is supplied to the hydraulic cylinder 2 via the first flow path 33. By arranging the flow rate control valve 40 at the stop position P3, the hydraulic oil discharged from the hydraulic pump 32 is discharged to the tank 35 via the second flow path 34. When the hydraulic oil discharged from the hydraulic pump 32 is discharged to the tank 35, the hydraulic oil discharged from the hydraulic pump 32 is discharged to the tank 35 via the bleed valve 50 without being supplied to the flow rate control valve 40.

When the working equipment element is present in the end section, the first control command for adjusting the flow rate of the hydraulic oil supplied to the hydraulic cylinder 2 via the flow rate control valve 40 and the second control command for adjusting the flow rate of the hydraulic oil discharged to the tank 35 via the bleed valve 50 are output from the control device 9. The cushion control is performed by outputting the first control command. The second control command is output such that an appropriate flow rate of the hydraulic oil is discharged to the tank 35 based on the flow rate of the hydraulic oil supplied to the hydraulic cylinder 2, whereby the flow force acting on the flow rate control valve 40 can be suppressed. In the cushion control, since the flow force is suppressed from acting on the flow rate control valve 40, an appropriate cushion effect can be obtained. By obtaining an appropriate cushion effect, deterioration of operability of the working equipment 1 is suppressed.

When the working equipment element is present in the end section and the working equipment element moves toward the end position, the first control command is output such that the flow rate of the hydraulic oil supplied to the hydraulic cylinder 2 decreases, whereby an appropriate cushion effect can be obtained. The flow force acting on the flow rate control valve 40 can be effectively suppressed by increasing the flow rate of the hydraulic oil discharged to the tank 35 in synchronization with the decrease in the flow rate of the hydraulic oil supplied to the hydraulic cylinder 2.

The control device 9 outputs the second control command based on the pressure of the hydraulic oil discharged from the hydraulic cylinder 2. Therefore, when the working equipment element is present in the end section, the pump pressure of the hydraulic pump 32 can be adjusted to an appropriate value.

When the pressure of the hydraulic oil discharged from the hydraulic cylinder 2 is equal to or less than the threshold, the control device 9 outputs the second control command such that the flow rate of the hydraulic oil discharged to the tank 35 via the bleed valve 50 decreases even if the working equipment element is present in the end section. Thus, when the working equipment element is operated in the end section, the working equipment element can exhibit sufficient excavation force. In addition, the process of warming the hydraulic oil is smoothly performed.

[Other Embodiments]

In the above-described embodiment, in a case where the pressure of the hydraulic oil discharged from the hydraulic cylinder 2 exceeds the threshold, when the arm 12 is present in the excavation side end section which is the end section on the excavation operation side of the arm 12, the aperture ratio of the bleed valve 50 is increased. The aperture ratio of the bleed valve 50 may be increased when the arm 12 is present in the dumping side end section which is an end section on the dumping operation side of the arm 12. In addition, the aperture ratio of the bleed valve 50 may be increased when the boom 11 is present in at least one of the end section on the raising operation side of the boom 11 and the end section on the lowering operation side of the boom 11. In addition, the aperture ratio of the bleed valve 50 may be increased when the bucket 13 is present in at least one of the end section on the dumping operation side of the bucket 13 and the end section on the excavation operation side of the bucket 13.

In the above-described embodiment, the work machine 100 is an excavator. The work machine 100 may be a machine having the working equipment 1, and may be a wheel loader or a bulldozer.

In the above-described embodiment, the hydraulic oil may be supplied from the plurality of flow rate control valves 40 to the hydraulic cylinder 2. In this case, the aperture ratios of the plurality of flow rate control valves 40 may be the same, or priority may be given to flow rate control valves 40 to make the aperture ratios different so as to increase the aperture ratios of the flow rate control valves 40 having a higher priority. In addition, the discharge amount of the hydraulic oil from the plurality of hydraulic pumps 32 connected to the respective flow rate control valves 40 may be made different.

REFERENCE SIGNS LIST

1 WORKING EQUIPMENT
2 HYDRAULIC CYLINDER
2A BOTTOM CHAMBER
2B ROD CHAMBER
3 SWING BODY
4 TRAVELING BODY
4C CRAWLER BELT
5 OPERATION DEVICE
6 DRIVER'S CAB
6S DRIVER'S SEAT
7 MACHINE CHAMBER
8 POSTURE SENSOR
9 CONTROL DEVICE
10 CONTROL SYSTEM
11 BOOM
12 ARM
13 BUCKET
21 BOOM CYLINDER
22 ARM CYLINDER
23 BUCKET CYLINDER
30 ENGINE
31 POWER TRANSMISSION MECHANISM
32 HYDRAULIC PUMP
33 FIRST FLOW PATH
33A SUPPLY FLOW PATH
33B DISCHARGE FLOW PATH
34 SECOND FLOW PATH
35 TANK
36 BOTTOM FLOW PATH
37 ROD FLOW PATH
38 DISCHARGE FLOW PATH
39 TANK FLOW PATH
40 FLOW RATE CONTROL VALVE
41 BOOM FLOW RATE CONTROL VALVE
42 ARM FLOW RATE CONTROL VALVE
43 BUCKET FLOW RATE CONTROL VALVE
50 BLEED VALVE
55 CHECK VALVE
56 RELIEF VALVE
60 PRESSURE SENSOR
61 BOOM PRESSURE SENSOR
62 ARM PRESSURE SENSOR
63 BUCKET PRESSURE SENSOR
81 BOOM POSTURE SENSOR
82 ARM POSTURE SENSOR
83 BUCKET POSTURE SENSOR
91 OPERATION COMMAND ACQUISITION UNIT
92 POSTURE DATA ACQUISITION UNIT
93 PRESSURE DATA ACQUISITION UNIT
94 STROKE END DETERMINATION UNIT
95 PRESSURE DETERMINATION UNIT
96 FLOW RATE CONTROL VALVE CONTROL UNIT
97 BLEED VALVE CONTROL UNIT
98 CORRELATION DATA STORAGE UNIT
99 THRESHOLD STORAGE UNIT
100 EXCAVATOR (WORK MACHINE)
Pa PUMP PORT
Pb BOTTOM PORT
Pc ROD PORT
Pd TANK PORT
Pe INFLOW PORT
Pf OUTFLOW PORT
P1 FIRST OPERATION POSITION
P2 SECOND OPERATION POSITION
P3 STOP POSITION
P4 DISCHARGE POSITION
P5 STOP POSITION
RX SWING AXIS

The invention claimed is:

1. A work machine control system, comprising:
a hydraulic pump;
a hydraulic cylinder that operates a working equipment element in a movable range based on hydraulic oil supplied from the hydraulic pump, the working equipment element includes a boom, an arm connected to the boom, and a bucket connected to the arm;
a first flow path connected to the hydraulic pump;
a second flow path branching from the first flow path;
a flow rate control valve that adjusts a flow rate of the hydraulic oil supplied to the hydraulic cylinder via the first flow path;
a bleed valve that adjusts a flow rate of the hydraulic oil discharged to a tank via the second flow path;
a posture sensor that detects a posture of the working equipment element in the movable range; and
a control device having a processor that outputs a first control command for adjusting the flow rate of the hydraulic oil supplied to the hydraulic cylinder and a second control command for adjusting the flow rate of the hydraulic oil discharged to the tank when it is determined that the working equipment element is present in an end section including an end position of the movable range based on detection data of the posture sensor,
wherein the control device outputs the first control command to decrease the flow rate of the hydraulic oil supplied to the hydraulic cylinder and the second control command to increase the flow rate of the hydraulic oil discharged to the tank when it is determined that the working equipment element is present in the end section.

2. The work machine control system according to claim 1, comprising:
an operation device that generates an operation command for operating the flow rate control valve, wherein
when it is determined that the working equipment element is present in the end section and the operation command is output such that the working equipment element moves toward the end position, the control device outputs the first control command such that the flow rate of the hydraulic oil supplied to the hydraulic cylinder becomes smaller than the flow rate of the hydraulic oil designated by the operation command, and outputs the second control command such that the flow rate of the hydraulic oil discharged to the tank becomes larger than the flow rate of the hydraulic oil designated by the operation command.

3. The work machine control system according to claim 2, wherein
the hydraulic cylinder includes a boom cylinder that operates the boom, an arm cylinder that operates the arm, and a bucket cylinder that operates the bucket,
the arm performs a dumping operation and an excavation operation by the arm cylinder,
the end section of the arm includes a dumping side end section including a dumping side end position of the arm when the arm finishes the dumping operation, and an excavation side end section including an excavation side end position of the arm when the arm finishes the excavation operation, and
when it is determined that the arm is present in the excavation side end section and the operation command is output such that the arm moves toward the excavation side end position, the control device outputs the first control command such that the flow rate of the hydraulic oil supplied to the hydraulic cylinder becomes smaller than the flow rate of the hydraulic oil designated by the operation command, and outputs the second control command such that the flow rate of the hydraulic oil discharged to the tank becomes larger than the flow rate of the hydraulic oil designated by the operation command.

4. The work machine control system according to claim 2, comprising:
a pressure sensor that detects a pressure of the hydraulic oil discharged from the hydraulic cylinder, wherein
the control device outputs the second control command based on detection data of the pressure sensor.

5. The work machine control system according to claim 4, wherein
when it is determined that the pressure of the hydraulic oil discharged from the hydraulic cylinder is equal to or less than a threshold based on the detection data of the pressure sensor, the control device outputs the second control command such that the flow rate of the hydraulic oil discharged to the tank decreases even when it is determined that the working equipment element is present in the end section and the operation command is output such that the working equipment element moves toward the end position.

6. The work machine control system according to claim 1, wherein
a spool of the flow rate control valve moves to a first operation position at which hydraulic oil is supplied to a bottom chamber of the hydraulic cylinder, a second operation position at which hydraulic oil is supplied to a rod chamber of the hydraulic cylinder, and a stop position at which hydraulic oil does not flow, the stop position being disposed between the first operation position and the second operation position, and
the second flow path branches from the first flow path between the hydraulic pump and the flow rate control valve.

7. A work machine comprising:
a working equipment including a plurality of working equipment elements;
a plurality of hydraulic cylinders that operate the plurality of working equipment elements, respectively; and
the work machine control system according to claim 1.

8. A work machine control method comprising:
operating a working equipment element in a movable range by a hydraulic cylinder, the working equipment element includes a boom, an arm connected to the boom, and a bucket connected to the arm;
detecting a posture of the working equipment element in the movable range;
adjusting a flow rate of hydraulic oil supplied to the hydraulic cylinder via a first flow path connected to a hydraulic pump and adjusting a flow rate of the hydraulic oil discharged to a tank via a second flow path branching from the first flow path when it is determined that the working equipment element is present in an end section including an end position of the movable range based on detection data of a posture of the working equipment element, and
acquiring an operation command for adjusting the flow rate of the hydraulic oil supplied to the hydraulic cylinder,
wherein when it is determined that the working equipment element is present in the end section and the operation command is output such that the working equipment element moves toward the end position, the flow rate of the hydraulic oil supplied to the hydraulic cylinder is decreased and the flow rate of the hydraulic oil discharged to the tank is increased.

9. The work machine control method according to claim 8, comprising:
detecting a pressure of the hydraulic oil discharged from the hydraulic cylinder, wherein
when it is determined that the pressure of the hydraulic oil discharged from the hydraulic cylinder is equal to or less than a threshold based on detection data of the pressure, the flow rate of the hydraulic oil discharged to the tank is decreased even when it is determined that the working equipment element is present in the end section and the operation command is output such that the working equipment element moves toward the end position.

10. A work machine control device, comprising:
a posture data acquisition unit that acquires detection data of a posture of a working equipment element operated in a movable range by a hydraulic cylinder, the working equipment element includes a boom, an arm connected to the boom, and a bucket connected to the arm;
a stroke end determination unit that determines whether or not the working equipment element is present in an end section including an end position of the movable range based on the detection data of the posture of the working equipment element;
a flow rate control valve control unit that adjusts a flow rate of hydraulic oil supplied to the hydraulic cylinder via a first flow path connected to a hydraulic pump when it is determined that the working equipment element is present in the end section;
a bleed valve control unit that adjusts a flow rate of the hydraulic oil discharged to a tank via a second flow path branching from the first flow path, and
a control device having a processor that outputs a first control command for adjusting the flow rate of the hydraulic oil supplied to the hydraulic cylinder and a second control command for adjusting the flow rate of the hydraulic oil discharged to the tank when it is determined that the working equipment element is present in an end section including an end position of the movable range based on detection data of the posture sensor,
wherein the control device outputs the first control command to decrease the flow rate of the hydraulic oil supplied to the hydraulic cylinder and the second control command to increase the flow rate of the hydraulic oil discharged to the tank when it is determined that the working equipment element is present in the end section.

* * * * *